(12) United States Patent
Li et al.

(10) Patent No.: US 12,349,069 B2
(45) Date of Patent: Jul. 1, 2025

(54) METHOD FOR PROCESSING SCELL DORMANCY INDICATION, TERMINAL, AND NETWORK DEVICE

(71) Applicant: VIVO MOBILE COMMUNICATION CO., LTD., Guangdong (CN)

(72) Inventors: Dongru Li, Guangdong (CN); Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 484 days.

(21) Appl. No.: 17/733,931

(22) Filed: Apr. 29, 2022

(65) Prior Publication Data

US 2022/0256462 A1    Aug. 11, 2022

Related U.S. Application Data

(63) Continuation of application No. PCT/CN2020/137137, filed on Dec. 17, 2020.

(30) Foreign Application Priority Data

Dec. 24, 2019   (CN) .......................... 201911349923.7

(51) Int. Cl.
*H04W 52/02* (2009.01)
*H04W 72/23* (2023.01)
*H04W 76/20* (2018.01)

(52) U.S. Cl.
CPC ....... *H04W 52/0232* (2013.01); *H04W 72/23* (2023.01); *H04W 76/20* (2018.02)

(58) Field of Classification Search
CPC . H04W 52/0232; H04W 72/23; H04W 76/20; H04W 52/0216; H04W 52/0235;
(Continued)

(56) References Cited

U.S. PATENT DOCUMENTS 9,544,885 B2 * 1/2017 You ..................... H04L 1/1861
10,791,512 B2   9/2020 Kadiri et al.
(Continued)

FOREIGN PATENT DOCUMENTS

CN    104412524 A    3/2015
CN    105940651 A    9/2016
(Continued)

OTHER PUBLICATIONS

Nory U.S. Appl. No. 62/902,428, filed Sep. 19, 2019 (Year: 2019).*
(Continued)

*Primary Examiner* — Wutchung Chu
(74) *Attorney, Agent, or Firm* — IP & T GROUP LLP

(57) ABSTRACT

A method for processing an Scell dormancy indication includes: receiving a PDCCH; and determining dormancy behavior of an Scell group based on the first PDCCH. The first PDCCH carries Scell dormancy indications in a one-to-one correspondence with at least two discontinuous reception groups, each Scell dormancy indication is used to indicate dormancy behavior of an Scell group in one of DRX groups, and the dormancy behavior includes entering a dormancy state or entering a non-dormancy state.

16 Claims, 6 Drawing Sheets

(58) Field of Classification Search
CPC . H04W 76/15; H04W 76/28; H04W 52/0225; H04L 5/0098; H04L 5/001; Y02D 30/70
See application file for complete search history.

(56) References Cited

U.S. PATENT DOCUMENTS

| | | | |
|---|---|---|---|
| 11,252,668 B2* | 2/2022 | Nory | H04W 52/0229 |
| 12,193,104 B2* | 1/2025 | He | H04L 41/0896 |
| 2014/0185467 A1 | 7/2014 | Heo et al. | |
| 2015/0195867 A1 | 7/2015 | Koc et al. | |
| 2015/0215929 A1 | 7/2015 | Damnjanovic et al. | |
| 2016/0309398 A1 | 10/2016 | Xue et al. | |
| 2017/0195099 A1* | 7/2017 | Kahtava | H04W 72/20 |
| 2019/0021052 A1* | 1/2019 | Kadiri | H04L 5/0098 |
| 2019/0124558 A1* | 4/2019 | Ang | H04L 5/001 |
| 2019/0215136 A1* | 7/2019 | Zhou | H04L 1/1819 |
| 2020/0313833 A1* | 10/2020 | Yi | H04L 5/001 |
| 2020/0314816 A1* | 10/2020 | Yi | H04L 5/0094 |
| 2021/0051698 A1* | 2/2021 | Tsai | H04W 72/23 |
| 2021/0092681 A1* | 3/2021 | Nory | H04W 76/28 |
| 2021/0105722 A1* | 4/2021 | Tsai | H04W 52/0229 |
| 2021/0136689 A1* | 5/2021 | Kim | H04W 24/08 |
| 2021/0144745 A1* | 5/2021 | Yang | H04W 72/23 |
| 2021/0176029 A1* | 6/2021 | Tsai | H04B 7/0626 |
| 2021/0360666 A1* | 11/2021 | Yoshimura | H04L 1/1896 |
| 2021/0377852 A1* | 12/2021 | Zhou | H04W 52/0235 |
| 2022/0173867 A1* | 6/2022 | Nogami | H04L 5/001 |
| 2022/0201613 A1* | 6/2022 | Nory | H04W 76/28 |
| 2022/0209920 A1* | 6/2022 | Wu | H04W 52/0225 |
| 2022/0240187 A1* | 7/2022 | Guo | H04W 76/30 |
| 2022/0256554 A1* | 8/2022 | Chen | H04L 1/1812 |
| 2022/0264574 A1* | 8/2022 | Xue | H04L 5/0032 |
| 2022/0279557 A1* | 9/2022 | Li | H04W 76/28 |
| 2022/0330378 A1* | 10/2022 | Seo | H04W 76/28 |
| 2022/0394619 A1* | 12/2022 | Berggren | H04W 76/28 |
| 2023/0171688 A1* | 6/2023 | Xu | H04W 76/28 370/311 |
| 2023/0217438 A1* | 7/2023 | Seo | H04L 5/0098 |
| 2023/0345374 A1* | 10/2023 | Nory | H04W 76/28 |

FOREIGN PATENT DOCUMENTS

| | | | | |
|---|---|---|---|---|
| CN | 110213837 A | | 9/2019 | |
| CN | 110572842 A | | 12/2019 | |
| CN | 110915269 A | | 3/2020 | |
| CN | 113038635 A | * | 6/2021 | H04W 52/0216 |
| EP | 2966918 A1 | | 1/2016 | |
| EP | 4014590 A1 | | 2/2021 | |
| EP | 3857931 B1 | * | 5/2024 | H04W 52/0216 |
| JP | 2023502946 A | * | 1/2023 | H04L 5/001 |
| KR | 20220076490 A | * | 6/2022 | H04L 1/1812 |
| WO | 2015/046923 A1 | | 4/2015 | |
| WO | WO-2021053097 A1 | * | 3/2021 | H04W 52/0225 |
| WO | WO-2021066711 A1 | * | 4/2021 | H04L 5/0053 |
| WO | WO-2021129504 A1 | * | 7/2021 | H04W 52/0216 |

OTHER PUBLICATIONS

Tsai U.S. Appl. No. 62/909,965, filed Oct. 3, 2019 (Year: 2019).*
CDRX enhancement for CA, 3GPP TSG-RAN2 Meeting #107bis, Oct. 14-18, 2019, p. 1-14, R2-1913196 Ericsson et al., Chongqing, China.
International Search Report and Written Opinion of International Application No. PCT/CN2020/137137 issued by the Chinese Patent Office on Mar. 16, 2021.
First Office Action on the Chinese Patent Application No. 201911349923.7 issued by the Chinese Patent Office.
Second Office Action on the Chinese Patent Application No. 201911349923.7 issued by the Chinese Patent Office on Dec. 9, 2022.
Office Action on the Japanese Patent Application No. 2022-528072 issued by the Japanese Patent Office on Jun. 6, 2023.
Office Action issued on the Indian Patent Application No. 202247028938 issued by the Indian Patent Office on Oct. 10, 2022.
Extended European Search Report on the European Patent Application No. 20906921.0 issued by the European Patent Office on Nov. 18, 2022.
Summary #2 of efficient and low latency serving cell configuration/activation/setup, 7.2.13.3, Oct. 14-18, 2019, 3GPP TSG RAN WG1 Meeting #98bis, Chongqing, China.
SCell Dormancy and Fast SCell Activation, 7.2.13.3, Nov. 18-22, 2019, pp. 1-13, 3GPP TSG-RAN WG1 #99, Reno, USA.
Email report [107bis#49][NR TEI16] cDRX enhancement for CA, 6.20.2 RAN2 led TEI16 enhancements—User plane related, Nov. 18-22, 2019, pp. 1-20, 3GPP TSG-RAN2 Meeting #108, Reno, USA.
Reconsideration Report by Examiner before Appeal for Japanese Patent Application No. 2022-528072 drafted by the Japanese Patent Office on Jul. 23, 2024.
Qualcomm Incorporated, RP-190993, Views on UE power saving WI, 3GPP RAN #84, Jun. 3-6, 2019, Qualcomm, Newport Beach.
Ericsson, Tdoc R1-1912780, Design of PDCCH-WUS, 3GPP TSG-RAN WG1 Meeting #99, 3GPP, Nov. 18-22, 2019, 3GPP, Reno, USA.
Huawei et al., R1-1910076, PDCCH-based power saving signal/channel, 3GPP TSG RAN WG1 Meeting #98bis, Oct. 14-20, 2019, 3GPP.
Vivo, R1-1910242, Fast Scell activation and dormancy like behavior, 3GPP TSG RAN WG1 #98bis, Oct. 14-20, 2019, 3GPP.
Office Action for Korean Patent Application No. 10-2022-7016850 issued by the Korean Patent Office on Feb. 26, 2025.

* cited by examiner

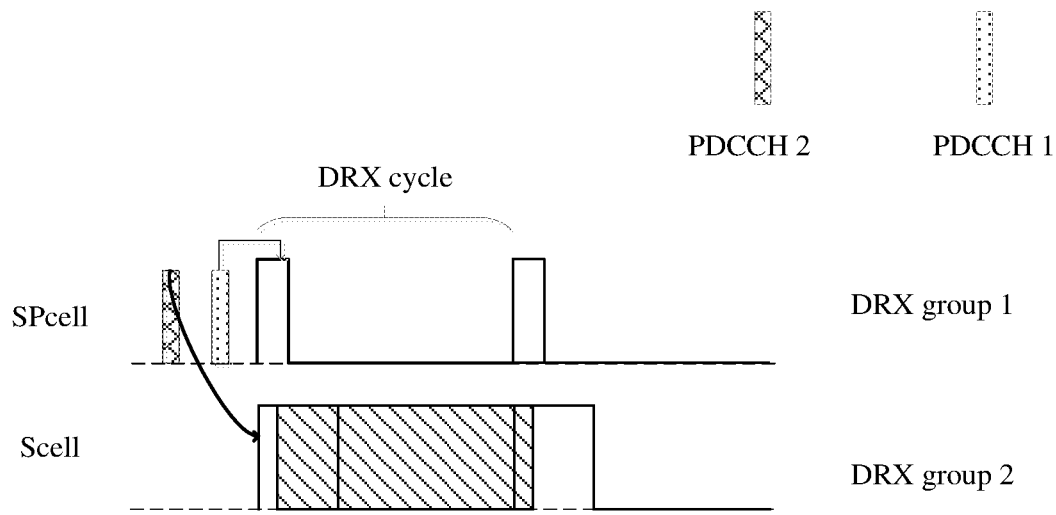
FIG. 6
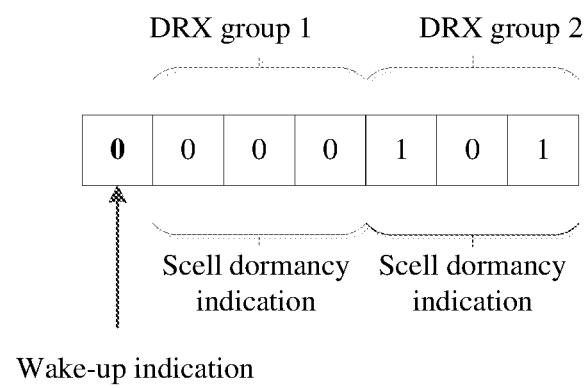
FIG. 7
| Send a first physical downlink control channel PDCCH to a terminal, wherein the first PDCCH carries Scell dormancy indications in a one-to-one correspondence with discontinuous reception groups (DRX groups) | — 801 |
FIG. 8

METHOD FOR PROCESSING SCELL DORMANCY INDICATION, TERMINAL, AND NETWORK DEVICE

CROSS-REFERENCE TO RELATED APPLICATIONS

This application is a Bypass Continuation Application of PCT/CN2020/137137 filed on Dec. 17, 2020, which claims priority to Chinese Patent Application No. 201911349923.7 filed on Dec. 24, 2019, which are incorporated herein by reference in their entirety.

TECHNICAL FIELD

The present application relates to the field of communications technologies, and in particular, to a method for processing an Scell dormancy indication, a terminal, and a network device.

BACKGROUND

With the development of communications technologies, a discontinuous reception (DRX) mechanism (or referred to as CDRX) is proposed in a new radio (NR) system. CDRX parameters are specified as follows: All cells belonging to a same carrier aggregation can be configured with only one set of CDRX parameters; or all cells belonging to a same carrier aggregation can be configured with a plurality of sets of CDRX parameters, where cells configured with a same set of CDRX parameters can form a CDRX group (or referred to as a DRX group). In a case that there are a plurality of CDRX groups, using a previous dormancy indication configuration to uniformly indicate dormancy indication of each secondary cell Scell has relatively low flexibility.

SUMMARY

Embodiments of the present application provide a method for processing a secondary cell Scell dormancy indication, a terminal, and a network device.

According to a first aspect, an embodiment of the present application provides a method for processing an Scell dormancy indication. The method is performed by a terminal and includes:
  receiving a first physical downlink control channel (PDCCH); and
  determining dormancy behavior of a secondary cell group (Scell group) based on the first PDCCH, where
  the first PDCCH carries Scell dormancy indications corresponding to at least two discontinuous reception groups (DRX groups), each Scell dormancy indication is used to indicate dormancy behavior of an Scell group in one of DRX groups, and the dormancy behavior includes entering a dormancy state or entering a non-dormancy state.

According to a second aspect, an embodiment of the present application provides a method for processing a secondary cell Scell dormancy indication. The method is performed by a network device and includes:
  sending a first PDCCH to a terminal, where the first PDCCH carries Scell dormancy indications corresponding to at least two DRX groups, each Scell dormancy indication is used to indicate dormancy behavior of an Scell group in one of DRX groups, and the dormancy behavior includes entering a dormancy state or entering a non-dormancy state.

According to a third aspect, an embodiment of the present application provides a terminal. The terminal includes:
  a receiving module, configured to receive a PDCCH; and
  a determining module, configured to determine dormancy behavior of an Scell group based on the first PDCCH, where
  the first PDCCH carries Scell dormancy indications corresponding to at least two DRX groups, each Scell dormancy indication is used to indicate dormancy behavior of an Scell group in one of DRX groups, and the dormancy behavior includes entering a dormancy state or entering a non-dormancy state.

According to a fourth aspect, an embodiment of the present application provides a network device. The network device includes:
  a sending module, configured to send a first PDCCH to a terminal, where the first PDCCH carries Scell dormancy indications corresponding to at least two DRX groups, each Scell dormancy indication is used to indicate dormancy behavior of an Scell group in one of DRX groups, and the dormancy behavior includes entering a dormancy state or entering a non-dormancy state.

According to a fifth aspect, an embodiment of the present application provides a terminal. The terminal includes a memory, a processor, and a program stored in the memory and executable on the processor, where when the program is executed by the processor, the steps of the foregoing method for processing an Scell dormancy indication are implemented.

According to a sixth aspect, an embodiment of the present application provides a network device. The network device includes a memory, a processor, and a program stored in the memory and executable on the processor, where when the program is executed by the processor, the steps of the foregoing method for processing an Scell dormancy indication are implemented.

According to a seventh aspect, an embodiment of the present application provides a non-transitory computer-readable storage medium. The non-transitory computer-readable storage medium stores a computer program, where when the computer program is executed by a processor, the steps of the foregoing method for processing an Scell dormancy indication are implemented.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings.

FIG. 6 is a fourth diagram of a PDCCH transmission example in a method for processing an Scell dormancy indication according to an embodiment of the present application;

FIG. 7 is a fifth diagram of a PDCCH transmission example in a method for processing an Scell dormancy indication according to an embodiment of the present application;

FIG. 8 is a second flowchart of a method for processing an Scell dormancy indication according to an embodiment of the present application;

DESCRIPTION OF EMBODIMENTS

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application shall fall within the protection scope of the present application.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present application, the term such as "exemplary" or "for example" is used to indicate an example, an instance, or a description. Any embodiment or design solution described as "exemplary" or "for example" in the embodiments of the present application should not be construed as being more preferred or advantageous than other embodiments or design solutions. To be precise, the use of the term such as "exemplary" or "for example" is intended to present a related concept in a specific manner.

The embodiments of the present application will be described below with reference to the accompanying drawings. The embodiments of the present application provide a method for processing an Scell dormancy indication, a terminal, and a network device, which are applicable to a wireless communication system. The wireless communications system may be a 5G system, or an evolved Long Term Evolution (eLTE) system, or a subsequent evolved communications system.

Figure 1:
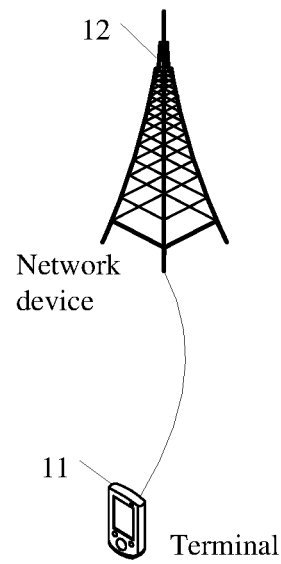
FIG. 1 is a structural diagram of a network system to which embodiments of the present application can be applied.

FIG. 1 is a structural diagram of a network system to which the embodiments of the present application are applicable. As shown in FIG. 1, a terminal 11 and a network device 12 are included. The terminal 11 may be a user terminal, or another terminal side device, such as a mobile phone, a tablet personal computer, a laptop computer, a personal digital assistant (PDA), a mobile Internet device (MID), or a wearable device. It should be noted that a specific type of the terminal 11 is not limited in the embodiments of the present application. The network device 12 may be a base station in 5G or a later release, or a base station in another communications system, or is referred to as a NodeB, an evolved NodeB, a transmission reception point (TRP), an access point (AP), or other terms in the field. The network device is not limited to specific technical terms, as long as a same technical effect is achieved. In addition, the network device 12 may be a master node (MN) or a secondary node (SN). It should be noted that in the embodiments of the present application, the 5G base station is merely used as an example, but a specific type of the network device is not limited.

For ease of understanding, the following describes some content in the embodiments of the present application.

I. DRX Basic Model

A DRX basic mechanism is used to configure a DRX cycle for a terminal UE in a radio resource control connected RRC_CONNECTED) state. A DRX cycle includes "on duration" and "opportunity for DRX". During "on duration", the UE monitors and receives a PDCCH in an activation period, but does not receive data of a downlink channel in a dormancy period "Opportunity for DRX", to reduce data consumption.

II. Configuration Parameter drx-onDurationTimer: When a DRX function is configured, drx-onDurationTimer represents duration by which corresponding medium access control (MAC) is in a wake-up state in a DRX cycle. drx-onDurationTimer calculates a start-up time point according to a specified formula. Once being started, drx-onDurationTimer runs until drx-onDurationTimer expires, where restarting is not allowed during this period.

drx-InactivityTimer: The drx-InactivityTimer represents duration by which the corresponding MAC needs to continuously monitor a PDCCH after receiving a PDCCH newly uploaded based on an indication. The drx-InactivityTimer is started or restarted at a first symbol after receiving of a PDCCH newly uploaded (uplink or downlink) based on an indication is completed. When the corresponding MAC receives a DRX command or Long DRX command MAC CE, the drx-InactivityTimer is stopped. When drx-InactivityTimer expires, in a case that the corresponding MAC configures a short DRX cycle, the short DRX cycle (Short-Drx-Cycle) starts; or in a case that the corresponding MAC does not configure a short DRX cycle, the long DRX cycle (longDRX-Cycle) starts.

longDRX-CycleStartOffset: This parameter may simultaneously represent two meanings: longDRX-Cycle and drxStartOffset. It should be noted that in a case that a network device also configures the parameter ShortDrx-Cycle, longDRX-Cycle should be configured to an integer multiple of ShortDrx-Cycle.

shortDRX-Cycle: This parameter represents duration of a short cycle used by DRX, where the unit is ms, for example, ms5 indicates that duration of the short cycle is 5 ms.

drx-ShortCycleTimer: This parameter indicates that longDRX-Cycle starts after a quantity of consecutive ondurations by which no PDCCH is received within shortDRX-Cycle reaches a certain value. In a case that drx-ShortCycleTimer is 2, it indicates that longDRX-Cycle starts when a PDCCH has not been successfully decoded within two consecutive ondurations. Duration corresponding to drx-ShortCycleTimer is an integer multiple of ShortDrx-Cycle. In a case that drx-InactivityTimer expires or a DRX command is received, and the corresponding MAC configures ShortDrx-Cycle, drx-ShortCycleTimer is started. In a case that the corresponding MAC enters longDRX-Cycle when drx-ShortCycleTimer expires, or a Long DRX Command is received, drx-ShortCycleTimer is stopped, and the corresponding MAC enters longDRX-Cycle.

III. Function of Wake Up Signal (WUS)

A WUS controls whether to start an onduration after the WUS. A WUS is based on a PDCCH, that is, a WUS is a PDCCH. A WUS exists in DRX off, namely, outside active time. The WUS may be considered as a small-scale PDCCH. Small-scale means that quantities of CORESETs and search spaces (SS) occupied by the WUS are less than those of CORESETs and search spaces occupied by a common PDCCH.

IV. Scell Dormancy Indication and Objective

To decrease a high-power-consumption problem caused when UE frequently monitors PDCCHs, in some scenarios, for example, in a carrier aggregation (CA) scenario, dormancy-like behavior and a PDCCH-based Scell dormancy indication field are introduced for an Scell.

Explanation of a dormancy state: In this state, based on a network device configuration, UE does not monitor a PDCCH or monitors a PDCCH by a long cycle, for example, monitors a PDCCH once every 2,560 slots. In this state, UE may perform channel state information (CSI) measurement and reporting. In this state, UE's power consumption is relatively low.

Explanation of a non-dormancy state (also referred to as an active state): In this state, based on a network device configuration, UE monitors a PDCCH frequently, for example, monitors a PDCCH in each downlink slot; and UE may perform CSI measurement and reporting. In this state, UE's power consumption is relatively high.

A Pcell does not has a dormancy state. Only an Scell has the dormancy state.

V. Relationship and Difference Between a WUS and an Scell Dormancy Indication

A WUS is used to indicate a per cell group (per CG) of each piece of UE; and each CG has only one DRX-related configuration. However, it is equivalent that an Scell dormancy indication further indicates dormancy behavior of each Scell group in a cell group controlled by a WUS.

VI. Descriptions of SS

Resource element (RE): a minimum unit of a NR physical layer resource. A resource element is a subcarrier in frequency domain, and is an orthogonal frequency division multiplex (OFDM) symbol in time domain.

Resource element group (REG): composed of one radio bearer (RB) (12 REs) in frequency domain, and composed of one OFDM in time domain.

REG bundle: including a group of REGs {iL, iL+1, . . . , iL+L−1}. L is determined based on a high-layer parameter CORESET-REG-bundle-size.

Control channel element (CCE): composed of six REGs. A control channel element is a logical resource unit of a PDCCH. A PDCCH is composed of n consecutive CCEs (namely, an aggregation level).

Aggregation level: indicates a quantity of CCEs that compose a PDCCH.

Concepts of control resource set (CORESET) and SS are as follows.

CORESET: indicates available resources of a PDCCH. A CORESET is composed of a plurality of RBs in frequency domain and one to three OFDM symbols in time domain.

PDCCH Search Space: indicates how to search for a PDCCH. UE attempts, by blindly testing a search space SS, to decode downlink control information (DCI) in a PDCCH and provide a corresponding CORESET.

A CORESET is used to resolve a range problem of a PDCCH, such as a time-domain length and a frequency-domain range. However, it can be learned from RRC signaling that a configuration of a CORESET does not specify a specific time-domain location (instead, only time-domain duration (a symbol quantity) is given); and the specific time-domain location is given by a monitoring occasion (MO) given by a search space. This design may achieve higher flexibility. A CORESET may be configured at any frequency-domain location (a configuration parameter FrequencyDomainResources IE is a bitmap numbered by a physical resource block (PRB) of a current BWP). Search space is used to resolve a problem of how to search by UE. A similar concept is used for LTE, to decrease complexity of a UE blind test as far as possible. NR differs from LTE in that for a CORESET, NR may configure different search spaces for different pieces of UE. In other words, different blind test manners (for example, by a monitoring cycle, or a start location and an end location of monitored symbols) are configured for different pieces of UE. Therefore, complexity of a UE blind test can be decreased. Search spaces have a certain cycle. One CORESET includes a plurality of SSs. One piece of UE may be configured with a plurality of CORESETs.

Figure 2:
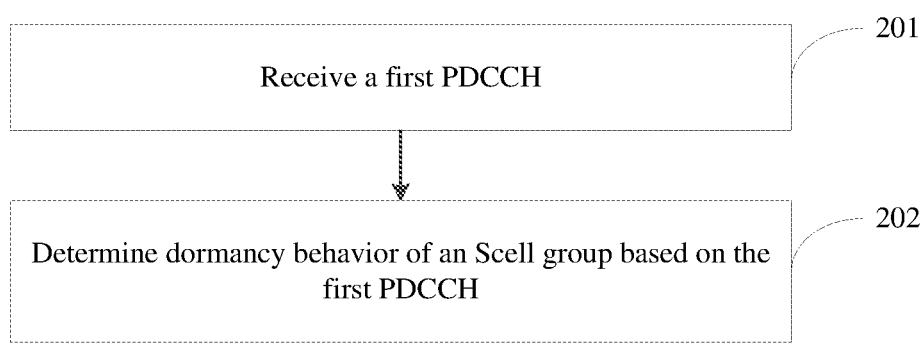
FIG. 2 is a first flowchart of a method for processing an Scell dormancy indication according to an embodiment of the present application.

FIG. 2 is a flowchart of a method for processing an Scell dormancy indication according to an embodiment of the present application. As shown in FIG. 2, the method is performed by a terminal and includes the following steps.

Step 201: Receive a first physical downlink control channel (PDCCH).

Step 202: Determine dormancy behavior of a secondary cell group (Scell group) based on the first PDCCH.

The first PDCCH carries Scell dormancy indications in a one-to-one correspondence with at least two discontinuous reception groups (DRX groups). Each Scell dormancy indication is used to indicate dormancy behavior of an Scell group in one of DRX groups. The dormancy behavior includes entering a dormancy state or entering a non-dormancy state. The Scell dormancy indications carried in the first PDCCH are used to determine whether at least some Scell groups in a plurality of DRX groups enter dormancy or non-dormancy.

Optionally, the first PDCCH is used to detect downlink control information DCI that is in a preset format and scrambled with a power saving radio network temporary identifier (PS-RNTI).

In this embodiment of the present application, the first PDCCH may include one second PDCCH (namely, one PDCCH), or at least two second PDCCHs (namely, at least two PDCCHs). In a case that the first PDCCH includes one second PDCCH, the second PDCCH carries at least two Scell dormancy indications. In a case that the first PDCCH includes at least two PDCCHs, each PDCCH carries one Scell dormancy indication.

In other words, in this embodiment of the present application, the first PDCCH includes any one of the following cases.

Case 1: The first PDCCH includes second PDCCHs in a one-to-one correspondence with the DRX groups (that is, each second PDCCH corresponds to one DRX group), and an Scell dormancy indication carried in a second PDCCH is used to indicate dormancy behavior of a first Scell group, the first Scell group is an Scell group in a DRX group corresponding to the second PDCCH. The second PDCCH is a PDCCH of a special cell SPcell. The second PDCCH may be understood as a PS-PDCCH. The SPcell may be a primary cell Pcell or a primary secondary cell PScell.

Case 2: The first PDCCH is a second PDCCH. The second PDCCH carries at least two of the Scell dormancy indications and wake-up indications in a one-to-one correspondence with the Scell dormancy indications.

Case 3: The first PDCCH is a second PDCCH. The second PDCCH carries at least two of the Scell dormancy indications and one wake-up indication.

That the Scell dormancy indication is used to indicate dormancy behavior of an Scell group in one of the DRX groups may be understood as follows: An Scell indication manner in a PDCCH is performing Scell dormancy indication by using an Scell group as a unit. The preset format is format 2_6 or another format. The following description uses an example in which the preset format is format 2_6. The first PDCCH may be understood as a PDCCH used to detect DCI that is in format 2_6 and scrambled with a PS-RNTI. Optionally, the network device may provide a plurality of search space sets for DCI in format 2_6 to the terminal. The terminal detects a PDCCH based on the search space set, thereby detecting DCI that is in format 2_6 and on a downlink BWP activated by a special cell (SPcell).

Optionally, in this embodiment, Scells may be grouped according to different DRX groups. Each Scell group is further divided into different Scell groups. DRX groups are in a one-to-one correspondence with Scell dormancy indications. The Scell dormancy indication is used to indicate dormancy behavior of an Scell group in a DRX group. It should be understood that, in the following embodiments, dormancy behavior of an Scell group in a DRX group may be understood as dormancy behavior of an Scell group activated in the DRX group.

It should be noted that, there may be different manners of dividing an Scell group, for example, dividing an Scell group by frequency range, frequency band, or RF receiver capability of UE. The value X of an Scell dormancy indication in a second PDCCH of each DRX group may be greater than or equal to 0 bits and less than or equal to 5 bits, that is, 0≤X≤5. RRC is to configure m-bit Scell dormancy indications respectively for all DRX groups by UE. Different DRX groups are independently configured with different m values.

In the embodiments of the present application, a first PDCCH is used to carry Scell dormancy indications in a one-to-one correspondence with DRX groups, to realize configuration of dormancy behavior of an Scell group in the DRX groups. In this way, different Scell dormancy indications can be configured for different DRX groups, thereby improving flexibility of an Scell dormancy indication. Therefore, power consumption of the terminal can be reduced.

Optionally, for case 1, it may be understood that an Scell dormancy indication in a 1st second PDCCH is used to indicate dormancy behavior of an Scell group in a first DRX group; and an Scell dormancy indication in a 2nd second PDCCH is used to indicate dormancy behavior of an Scell group in a second DRX group. A difference between the first DRX group and the second DRX group is that the DRX groups have different values of at least one of DRX configuration parameters. The DRX configuration parameter may include drx-InactivityTimer, drx-onDurationTimer, and the like.

Figure 3:
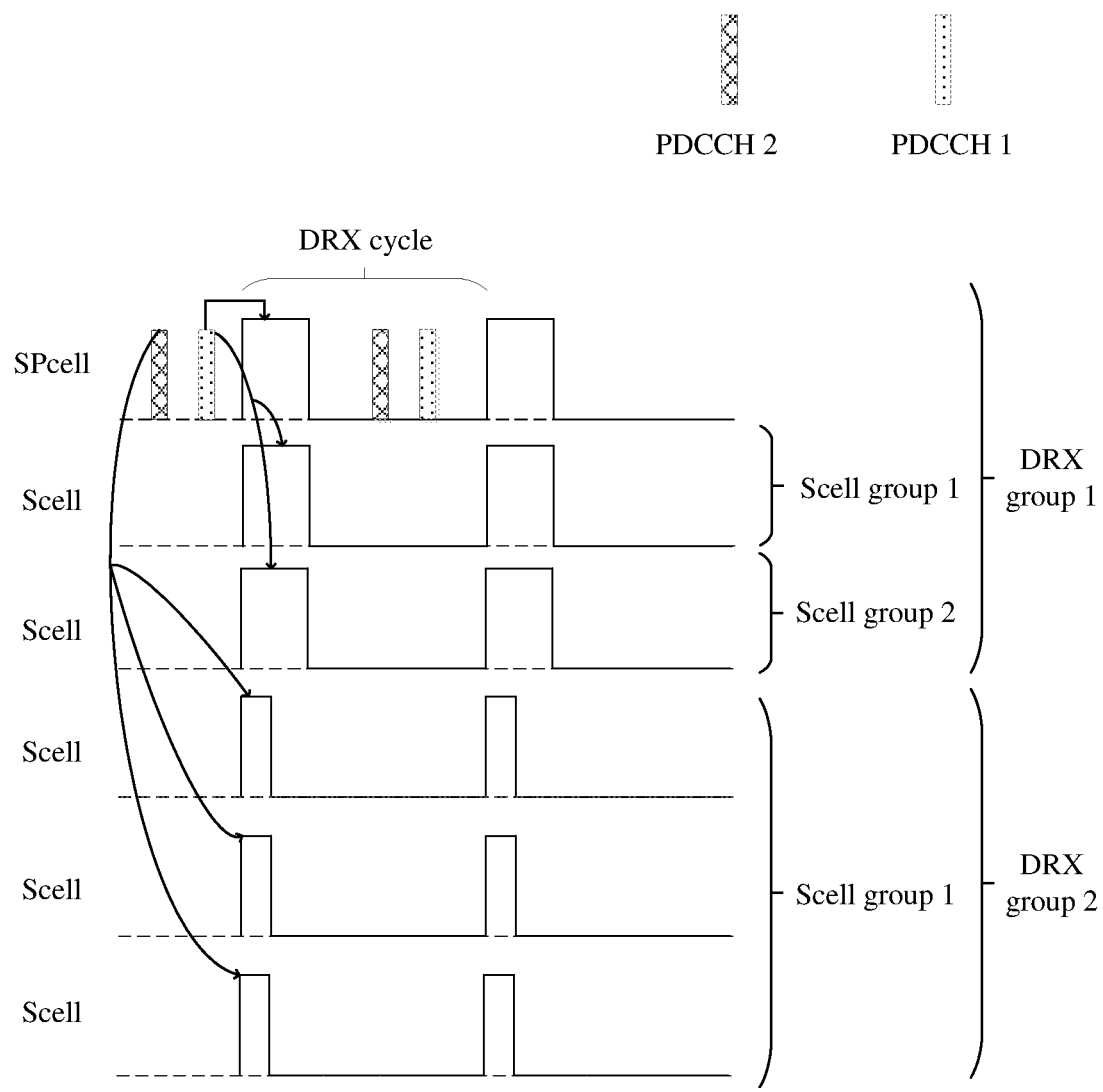
FIG. 3 is a first diagram of a PDCCH transmission example in a method for processing an Scell dormancy indication according to an embodiment of the present application.
Figure 4:
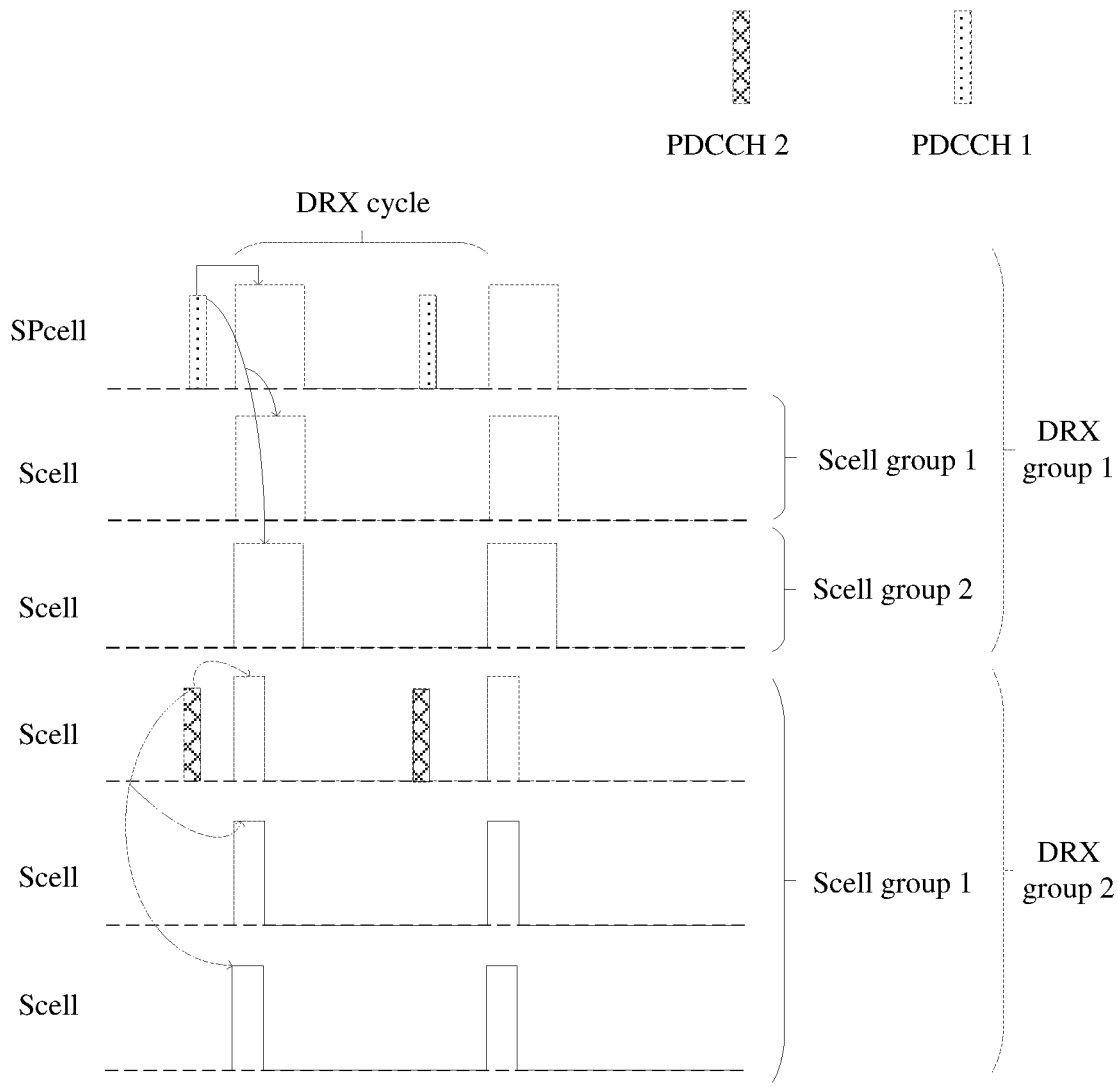
FIG. 4 is a second diagram of a PDCCH transmission example in a method for processing an Scell dormancy indication according to an embodiment of the present application.

All second PDCCHs may be disposed on an SPCell. Alternatively, the second PDCCHs may be disposed on SCells in corresponding DRX groups. As shown in FIG. 3, in an embodiment, the second PDCCH is a PDCCH of an SPcell. As shown in FIG. 4, in another embodiment, the second PDCCH is a PDCCH of a target cell in a DRX group corresponding to the second PDCCH. In a case that the DRX group corresponding to the second PDCCH includes an SPcell, the target cell is an SPcell. In a case that the DRX group corresponding to the second PDCCH does not include an SPcell, the target cell is an Scell in the DRX group. It should be understood that each DRX group may include one or more Scell groups; and each Scell group may include one or more Scells.

The following description uses two second PDCCHs as examples. As shown in FIG. 3 and FIG. 4, The two second PDCCHs are PDCCH1 and PDCCH2. PDCCH1 corresponds to DRX group 1. DRX group 1 corresponds to frequency range 1. PDCCH2 corresponds to DRX group 2. DRX group 2 corresponds to frequency range 2. DRX group 1 includes two Scell groups (namely, Scell group 1 and Scell group 2). Each Scell group includes one Scell. DRX group 2 includes one Scell groups (namely, Scell group 1). The Scell group includes three Scells. In this case, an Scell dormancy indication carried in PDCCH1 may include 2 bits; and an Scell dormancy indication carried in PDCCH2 may include 1 bit.

Figure 5:
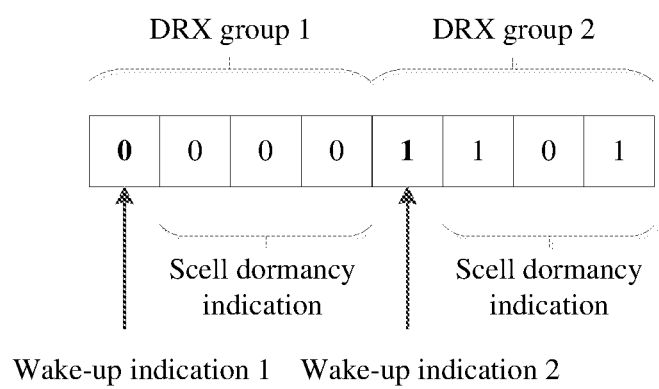
FIG. 5 is a third diagram of a PDCCH transmission example in a method for processing an Scell dormancy indication according to an embodiment of the present application.

For case 2, only one second PDCCH is configured on an SPCell, a quantity of bits of a wake-up indication is configured based on a plurality of DRX groups. For example, a 2-bit wake-up indication is configured for two DRX groups. As shown in FIG. 5, for ease of enabling the terminal and the network device to have a same understanding, all Scell groups configured for different DRX groups may have a same quantity of bits (that is, quantities of bits occupied by all Scell dormancy indications are consistent).

It should be understood that for different configurations of a first PDCCH, accordingly, the following describes in detail such an implementation that the terminal has not detected dormancy behavior of a corresponding second PDCCH or no dormancy behavior has a valid monitoring occasion.

Solution 1: For case 1 and case 2, in a case that the terminal is configured with a search space set used to monitor the second PDCCH, and the terminal has not detected the second PDCCH, dormancy behavior (dormancy or non-dormancy) of an Scell group in a DRX group corresponding to the second PDCCH which is undetected meets any one of the following.

Solution 1.1: In a case that a radio resource control RRC configuration carries a target indication, the dormancy behavior of the Scell group in the DRX group corresponding to the second PDCCH which is undetected is determined based on the target indication, where the target indication is used to indicate dormancy behavior of an Scell group in a DRX group corresponding to each second PDCCH. (In other words, in this embodiment, the target indication is used to indicate dormancy behavior of a second PDCCH undetected by the terminal). In solution 1.1, in a case that a quantity of second PDCCHs that have not been detected is N1, N1 second PDCCHs are determined based on the target indication.

Solution 1.2: In a case that an RRC configuration does not carry the target indication, the dormancy behavior of the Scell group in the DRX group corresponding to the second PDCCH which is undetected is determined based on default dormancy behavior. In solution 1.2, in a case that a quantity of second PDCCHs that have not been detected is N, the N second PDCCHs are determined based on default dormancy behavior defined by a protocol.

Solution 1.3: The dormancy behavior of the Scell group in the DRX group corresponding to the second PDCCH which is undetected is consistent with the latest dormancy behavior. In solution 1.3, dormancy behavior for a second Scell group (an Scell group in a DRX group corresponding to a second PDCCH) is consistent with the latest dormancy behavior of the second Scell group. For example, in a case that the latest dormancy behavior of the second Scell group is entering a non-dormancy state, the terminal remains in the non-dormancy state when the second PDCCH has not been detected. Alternatively, in a case that the latest dormancy behavior of the second Scell group is entering a dormancy state, the terminal remains in the dormancy state when the second PDCCH has not been detected.

In this embodiment of the present application, the target indication may be understood as dormancy behavior indication performed by using an Scell group as a unit. In other words, when a search space set used to monitor a second PDCCH is configured, and the terminal has not detected the second PDCCH, dormancy control may be performed on an Scell group in a DRX group corresponding to the second PDCCH based on dormancy behavior indicated by the Scell group in the DRX group. The dormancy behavior indicates that when an Scell group in the DRX group is dormant (in other words, enters the dormancy state), the Scell group enters the dormancy state. Alternatively, the dormancy behavior indicates that when an Scell group in the DRX group is non-dormant (in other words, enters the non-dormancy state), the Scell group enters the non-dormancy state. Because in this embodiment of the present application, dormancy behavior of each DRX group is indicated based on a quantity of DRX groups, flexibility of indicating dormancy behavior of an Scell group in the DRX group is improved.

That the dormancy behavior of the second Scell group is consistent with the latest dormancy behavior of the second Scell group may be understood as follows: The current dormancy behavior of the second Scell group is consistent with the last dormancy behavior of the second Scell group. In a case that the last dormancy behavior is entering the dormancy state, the current dormancy behavior is entering the dormancy state. In a case that the last dormancy behavior is entering the non-dormancy state, the current dormancy behavior is entering the non-dormancy state.

Optionally, that the dormancy behavior of the second Scell group is consistent with the latest dormancy behavior of the second Scell group may be configured by a network device or specified by a protocol. This is not further limited herein.

For solution 1.1, in an embodiment, an Scell state may be determined based on an RRC parameter ps-WakeupOrNot (an RRC parameter used when UE fails to detect a WUS used to control whether to start onduration_timer) and a rule related to this parameter (for example, Scell states corresponding to ps-WakeupOrNot=0 and ps-WakeupOrNot=1 are the dormancy state and the non-dormancy state respectively). RRC configures whether DRX groups controlled by undetected second PDCCHs start related drx-onDuration-Timer and Scell dormancy behavior thereof or not. For example, independent configuration is performed in the form of a bitmap. (ps-WakeupOrNot for an undetected PS-PDCCH may be 0 or 1.) For example, in a case that there are two DRX groups, RRC configures PS-PDCCH missing detection behavior of DRX group 1 to skip starting a timer of DRX group 1, and configures PS-PDCCH missing detection behavior of DRX group 2 to skip starting a timer of DRX group 2.

In a case that RRC configures a DRX group controlled by an undetected second PDCCH to start a timer, namely, "1", except for an SPcell, an Scell group in the DRX group enters the non-dormancy state. In a case that RRC configures a DRX group controlled by an undetected second PDCCH to skip starting a timer or starting a timer is skipped by default when RRC does not perform configuration, namely, "0", an Scell group in the DRX group enters the dormancy state.

In another embodiment, RRC may explicitly indicate default dormancy behavior. In other words, RRC configures current Scell behavior. That is, RRC configures an Scell controlled by an undetected second PDCCH to enter the dormancy state or the non-dormancy state.

For solution 1.2, it may be understood that, in a case that RRC does not configure related UE behavior, the behavior is entering the dormancy state or the non-dormancy state by default.

For solution 1.3, it may be understood that, an Scell controlled by an undetected second PDCCH remains in the latest or newest state, for example, remaining in the dormancy state or the non-dormancy state.

Solution 2: For case 1 and case 2, in a case that the terminal is configured with a search space set used to monitor the second PDCCH, and a cell configured with a second PDCCH has no valid monitoring occasion, dormancy behavior of Scell groups in DRX groups corresponding to N second PDCCHs that have no valid monitoring occasion meets any one of the following.

Solution 2.1: Scell groups in L1 first DRX groups enter a non-dormancy state, and the L1 first DRX groups are some or all of DRX groups corresponding to the N second PDCCHs, where both L1 and N are positive integers.

Solution 2.2: The Scell groups in the L1 first DRX groups enter a dormancy state.

Solution 2.3: In a case that an RRC configuration carries a target indication, the dormancy behavior of the Scell group in the DRX group corresponding to the N second PDCCHs that have no valid monitoring occasion is determined based on the target indication, where the target indication is used to indicate dormancy behavior of an Scell group in a DRX group corresponding to each second PDCCH.

Solution 2.4: In a case that an RRC configuration does not carry the target indication, the dormancy behavior of the Scell group in the DRX group corresponding to the N second PDCCHs that have no valid monitoring occasion is determined based on default dormancy behavior.

Solution 2.5: The dormancy behavior of the Scell group in the DRX group corresponding to the N second PDCCHs that have no valid monitoring occasion is undetected is consistent with latest dormancy behavior.

That cells of the N second PDCCHs have no valid monitoring occasion may be understood as follows: The network device configures an MO, but no valid MO exists within a detection range of the N second PDCCHs (covered by active time or canceled out by another signal channel). It may be understood that there is no valid monitoring occasion in any one of the following cases.

Monitoring a PDCCH to detect DCI format 2_6 is not required for all corresponding PDCCH monitoring occasions out of active time of a next DRX cycle.

No PDCCH monitoring occasion used to detect DCI format 2_6 exists out of active time of a next DRX cycle.

For solution 2.1 and solution 2.2, it may be understood that: Scell groups relates to all of DRX groups corresponding to the N second PDCCHs enter the non-dormancy state or the dormancy state; or Scell groups relates to some of the DRX groups corresponding to the N second PDCCHs enter the non-dormancy state or the dormancy state. For example, in a case that all the second PDCCHs have no valid MO, an Scell group in primary DRX group 1 (namely, a DRX group that includes an SPcell) may be configured to enter the non-dormancy state, and an Scell group in secondary DRX group 2 (namely, a DRX group that does not include an SPcell) to enter the dormancy state.

For solution 2.3, it may be understood that, RRC may explicitly indicate dormancy behavior. In other words, RRC configures current Scell behavior. That is, RRC configures an Scell controlled by an undetected second PDCCH to enter the dormancy state or the non-dormancy state.

For solution 2.4, it may be understood that, in a case that RRC does not configure dormancy behavior, dormancy behavior of the Scell groups in the DRX groups corresponding to the N second PDCCHs is default behavior specified by a protocol (such as entering the dormancy state or the non-dormancy state).

Solution 3: For case 1 and case 3, in a case that the terminal is configured with a search space set used to monitor the second PDCCH, and an Scell configured with no second PDCCH has no valid monitoring occasion, dormancy behavior of an Scell group meets at least one of the following:

dormancy behavior of an Scell group in L2 second DRX groups is determined based on an Scell dormancy indication in a second PDCCH corresponding to a second DRX group; or dormancy behavior of an Scell group corresponding to L3 third DRX groups is determined according to a preset rule, where both L2 and L3 are positive integers, the L2 second DRX groups are some or all of DRX groups corresponding to the second PDCCHs, and the L3 third DRX groups are some or all of the DRX groups corresponding to the second PDCCHs.

In an optional embodiment, the second DRX group includes an SPcell, and each third DRX group does not include an SPcell.

As shown in FIG. 6, DRX group 1 and DRX group 2 are included. Active time of an Scell in DRX group 2 (an Scell of an un-configured second PDCCH) is denoted by a slash-containing shadow area in the figure. It may be understood, based on the slash-containing shadow area, that the Scell of the un-configured second PDCCH has no valid monitoring occasion. In this case, dormancy behavior of the Scell may include the following:

In an embodiment, (an indication of a second PDCCH of a DRX group containing an SPcell is valid) because a Pcell includes two independent second PDCCHs, all Scells in DRX group 2 may conform to a dormancy behavior configuration in the preset rule, and all Scells in DRX group 1 may still conform to the indication of the second PDCCH.

In another embodiment, (all second PDCCH indications are invalid) as long as there is no valid second PDCCH before a cell, the cell needs to conform to the dormancy behavior configuration in the preset rule, no matter whether the cell is an Scell or a Pcell. In other words, some or all Scell groups (all Scell groups in some DRX groups) enter the non-dormancy state or the dormancy state.

In still another embodiment, (all second PDCCH indications are valid) dormancy behavior is performed according to the second PDCCH indications.

The preset rule may be understood as the rule defined in solution 2. Optionally, the preset rule includes at least one of the following:

an Scell group in some or all of the third DRX groups enters a non-dormancy state;

an Scell group in some or all of the third DRX groups enters a dormancy state;

in a case that an RRC configuration carries a target indication, the dormancy behavior of the Scell group in the DRX group corresponding to the second PDCCH which is undetected is determined based on the target indication, where the target indication is used to indicate default dormancy behavior of an Scell group in a third DRX group corresponding to each second PDCCH;

in a case that an RRC configuration does not carry the target indication, the dormancy behavior of the Scell group in the DRX group corresponding to the second PDCCH which is undetected is determined based on default dormancy behavior; or the dormancy behavior of the Scell group in the DRX group corresponding to the second PDCCH which is undetected is consistent with latest dormancy behavior.

Optionally, in an embodiment, the method further includes: receive high-layer signaling sent by a network device, where the high-layer signaling carries power saving offsets PS-offsets in a one-to-one correspondence with the DRX groups.

In this embodiment of the present application, a PS-offset may be a configuration for a (per) DRX group, that is, different PS-offsets are configured based on DRX groups. A PS-offset is used to indicate that UE starts to monitor a second PDCCH based on an SS.

It should be noted that, in this embodiment of the present application, the first PDCCH further includes a wake-up indication, where the wake-up indication is used to indicate an on or off state of a drx-onDurationTimer.

It should be understood that, in this embodiment of the present application, the wake-up indication may be used to indicate drx-onDurationTimer states corresponding to one or more DRX groups. In an optional embodiment, wake-up indications and dormancy indications in a second PDCCH are in a one-to-one correspondence with each other in a case that each wake-up indication is used to indicate a drx-onDurationTimer state corresponding to one DRX group.

In a case that a wake-up indication corresponding to a fourth DRX group indicates that the drx-onDurationTimer is off, an Scell group in the fourth DRX group enters a dormancy state, where the fourth DRX group is any one of the DRX groups.

In other words, in this embodiment of the present application, As long as PS-PDCCH indicates that ondurationtimer is not started, an Scell dormancy indication of a related DRX group needs to indicate that the Scell group enters or remains in the dormancy state. In a case that ondurationtimer is started, an Scell state may be determined according to conditions specified in solution 1 to solution 3.

To better understand the implementation of the present application, description is given in detail below through different embodiments.

Embodiment 1: As shown in FIG. 3, each DRX group is configured with one PS-PDCCH (full name: a PDCCH that is used to detect DCI format 2_6 and scrambled with a PS-RNTI). In other words, at least two PS-PDCCH monitoring occasions (PS-PDCCH MOs) respectively indicating different DRX groups exist before each DRX ON. In addition, all the PS-PDCCH MOs are configured on a PCell or a PScell (in a DC scenario, UE configures a plurality of cell groups, and each cell group has one Pcell or PScell, where Pcell and PScell are collectively referred to as SPcell).

Optionally, in an Scell dormancy indication, Scells are classified into different DRX groups, and Scells in each DRX group are further classified into different Scell groups. Two different PS-PDCCHs are used to respectively and independently indicate dormancy behavior of Scell group in each DRX group. There may be different manners of dividing an Scell group, for example, dividing an Scell group by frequency range, frequency band, or RF receiver capability of UE. The value X of an Scell dormancy indication in a PS-PDCCH of each DRX group may be greater than or equal to 0 bits and less than or equal to 5 bits, that is, $0 \leq X \leq 5$. RRC is to configure m-bit Scell dormancy indications respectively for all DRX groups by UE. Different DRX groups are independently configured with different m values. The design of configuring PS-PDCCHs respectively based on different DRX groups is more flexible.

PS-PDCCH Detection

Case 1: An MO is configured, but UE has not detected a PS-PDCCH: In a case that the UE is provided with a search space set (an SS set) to monitor a PS-PDCCH in a PCell or a PSCell, and UE has not detected DCI format 2_6, behavior of an Scell includes one of the following:

Option 1: An Scell state may be determined based on an RRC parameter ps-WakeupOrNot (an RRC parameter indicating that UE fails to detect whether a WUS controls onduration_timer to start) and a rule related to this parameter (for example, which states are Scell states corresponding to ps-WakeupOrNot=0 and ps-WakeupOrNot=1). RRC configures whether DRX groups controlled by undetected PS-PDCCHs start related drx-onDurationTimer and Scell dormancy behavior thereof or not. For example, independent configuration is performed in the form of a bitmap. (ps-WakeupOrNot for an undetected PS-PDCCH may be 0 or 1.) For example, in a case that there are two DRX groups, RRC configures PS-PDCCH missing detection behavior of DRX group 1 to skip starting a timer of DRX group 1, and configures PS-PDCCH missing detection behavior of DRX group 2 to skip starting a timer of DRX group 2.

In a case that RRC configures a DRX group controlled by an undetected PS-PDCCH to start a timer, namely, '1', except for a Pcell, an Scell group in the DRX group enters the dormancy state or the non-dormancy state.

In a case that RRC configures a DRX group controlled by an undetected PS-PDCCH to skip starting a timer or starting a timer is skipped by default when RRC does not perform configuration, namely, '0', an Scell group in the DRX group needs to enter the dormancy state.

Option 2: An indication is displayed. RRC configures current Scell behavior. That is, RRC configures an Scell controlled by an undetected PS-PDCCH to enter the dormancy state or the non-dormancy state. In a case that RRC does not perform configuration, the behavior is entering the dormancy state or the non-dormancy state by default.

Option 3: No indication exists and the current state is kept (No indication and keep the current state). An Scell controlled by an undetected PS-PDCCH remains in the latest or newest state, for example, remaining in the dormancy state or the non-dormancy state.

Case 2 (no valid MO exist on a Pcell): An MO is configured, but no valid MO exists within a detection range of the PS-PDCCH (covered by active time or canceled out by another signal channel). In this case, ondurationtimer of a DRX group is started, and Scell behavior includes one of the following:

Option 4: Scell groups relates to some or all DRX groups (all Scell groups in the some DRX groups) enter the non-dormancy state or the dormancy state. For example, in a case that all PS-PDCCHs have no valid MO, an Scell group in primary DRX group 1 (namely, a DRX group that includes a Pcell) may be configured to enter the non-dormancy state, and an Scell group in secondary DRX group 2 (namely, a DRX group that does not include a Pcell) to enter the dormancy state.

Option 5: An indication is displayed. RRC configures current Scell behavior. That is, RRC configures an Scell controlled by an undetected PS-PDCCH to enter the dormancy state or the non-dormancy state. In a case that RRC does not perform configuration, the behavior is entering the dormancy state or the non-dormancy state by default.

Option 6: No indication exists and the current state is kept (No indication and keep the current state). An Scell controlled by an undetected PS-PDCCH remains in the latest or newest state, for example, remaining in the dormancy state or the non-dormancy state.

Case 3: As shown in FIG. 6, in a case that the terminal is configured with a search space set used to monitor the PS-PDCCH, and an Scell configured with no PS-PDCCH has no valid monitoring occasion, Scell behavior includes one of the following:

Option 7: (A PS-PDCCH indication of a DRX group containing a Pcell is valid.) Because a Pcell includes two independent PS-PDCCHs, all Scells in DRX group 2 may conform to a dormancy behavior configuration in the preset rule, and all Scells in DRX group 1 may still conform to the PS-PDCCH indication.

Option 8: (All PS-PDCCH indications are invalid.) As long as there is no valid PS-PDCCH before a cell, the cell needs to conform to the dormancy behavior configuration in the preset rule, no matter whether the cell is an Scell or a Pcell. In other words, some or all Scell groups (all Scell groups in some DRX groups) enter the non-dormancy state or the dormancy state.

Option 9: (All PS-PDCCH indications are valid.) Dormancy behavior is performed according to the PS-PDCCH indications.

Optionally, a PS-offset may be a configuration for a per DRX group, that is, different PS-offsets are configured based on DRX groups.

Optionally, in the foregoing cases, as long as PS-PDCCH indicates that ondurationtimer is not started, an Scell dormancy indication of a related DRX group needs to indicate that the Scell group enters or remains in the dormancy state. In a case that ondurationtimer is started, an Scell state is configurable and may be determined according to the foregoing cases.

Embodiment 2: As shown in FIG. 4, each DRX group is configured with one PS-PDCCH, and PS-PDCCHs are respectively configured on different cells. One Scell is selected as a PS-PDCCH Scell. A PS-PDCCH is configured for the Scell to indicate a DRX group.

An Scell dormancy indication is consistent with that in embodiment 1. Details are not described herein again.

A difference between PS-PDCCH detection in this embodiment and that in embodiment 1 lies only in that because for a Pcell or a PS-PDCCH Scell, all PS-PDCCHs before DRX ON only independently control Scell dormancy behavior corresponding to their own DRX groups, this part does not include case 3, but includes only case 1 and case 2. (Case 1 and case 2 in this part differ slightly from those in embodiment 1, and need to be changed to cases in which there is one PS-PDCCH.)

Embodiment 3: As shown in FIG. 5, only one PS-PDCCH is configured on a PCell, a quantity of bits of a wake-up indication is increased based on a plurality of DRX groups. For example, a 2-bit wake-up indication is configured for two DRX groups.

PS-PDCCH detection: In this embodiment, only case 3 (a case in which only one PS-PDCCH is taken into consideration) exists.

Embodiment 4: As shown in FIG. 7, only one PS-PDCCH is configured on a PCell, and there is only one wake-up indication bit. In other words, a plurality of DRX groups are indicated by the one wake-up indication bit.

PS-PDCCH detection: In this embodiment, only case 3 (a case in which only one PS-PDCCH is taken into consideration) exists.

FIG. 8 is a flowchart of another method for processing an Scell dormancy indication according to an embodiment of the present application. As shown in FIG. 8, the method is performed by a network device and includes the following step.

Step 801: Send a first physical downlink control channel PDCCH to a terminal, where the first PDCCH carries Scell dormancy indications corresponding to at least two DRX groups, each Scell dormancy indication is used to indicate dormancy behavior of an Scell group in one of the DRX groups, and the dormancy behavior includes entering a dormancy state or entering a non-dormancy state.

Optionally, the first PDCCH includes second PDCCHs in a one-to-one correspondence with the DRX groups, and the Scell dormancy indication carried in the second PDCCH is used to indicate dormancy behavior of a first Scell group that is an Scell group in a DRX group corresponding to the second PDCCH.

Optionally, the second PDCCH is a PDCCH of a special cell SPcell.

Optionally, the second PDCCH is a PDCCH of a target cell in a DRX group corresponding to the second PDCCH, where in a case that the DRX group corresponding to the second PDCCH includes an SPcell, the target cell is an SPcell; or in a case that the DRX group corresponding to the second PDCCH does not include an SPcell, the target cell is an Scell.

Optionally, the first PDCCH is a second PDCCH, and the second PDCCH carries at least two of the Scell dormancy indications.

Optionally, the method further includes:
sending a radio resource control RRC configuration to the terminal, where the RRC configuration is used to indicate that: in a case that the terminal is configured with a search space set used to monitor the second PDCCH, and the terminal has not detected the second PDCCH, dormancy behavior of an Scell group in a DRX group corresponding to the second PDCCH which is undetected meets any one of the following:
in a case that a radio resource control RRC configuration carries a target indication, the dormancy behavior of the Scell group in the DRX group corresponding to the second PDCCH which is undetected is determined based on the target indication, where the target indication is used to indicate dormancy behavior of an Scell group in a DRX group corresponding to each second PDCCH;

in a case that an RRC configuration does not carry the target indication, the dormancy behavior of the Scell group in the DRX group corresponding to the second PDCCH which is undetected is determined based on default dormancy behavior; and the dormancy behavior of the Scell group in the DRX group corresponding to the second PDCCH which is undetected is consistent with latest dormancy behavior.

Optionally, the method further includes:
sending a radio resource control RRC configuration to the terminal, where the RRC configuration is used to indicate that: in a case that the terminal is configured with a search space set used to monitor the second PDCCH, and a cell configured with a second PDCCH has no valid monitoring occasion, dormancy behavior of Scell groups in DRX groups corresponding to N second PDCCHs that have no valid monitoring occasion meets any one of the following:

Scell groups in L1 first DRX groups enter a non-dormancy state, and the L1 first DRX groups are some or all of DRX groups corresponding to the N second PDCCHs, where both L1 and N are positive integers;

the Scell groups in the L1 first DRX groups enter a dormancy state;

in a case that an RRC configuration carries a target indication, the dormancy behavior of the Scell group in the DRX group corresponding to the N second PDCCHs that have no valid monitoring occasion is determined based on the target indication, where the target indication is used to indicate dormancy behavior of an Scell group in a DRX group corresponding to each second PDCCH;

in a case that an RRC configuration does not carry the target indication, the dormancy behavior of the Scell group in the DRX group corresponding to the N second PDCCHs that have no valid monitoring occasion is determined based on default dormancy behavior; and the dormancy behavior of the Scell group in the DRX group corresponding to the N second PDCCHs that have no valid monitoring occasion is consistent with latest dormancy behavior.

Optionally, the method further includes:
sending a radio resource control RRC configuration to the terminal, where the RRC configuration is used to indicate that: in a case that the terminal is configured with a search space set used to monitor the second PDCCH, and an Scell configured with no second PDCCH has no valid monitoring occasion, dormancy behavior of an Scell group meets at least one of the following:

dormancy behavior of an Scell group in L2 second DRX groups is determined based on an Scell dormancy indication in a second PDCCH corresponding to a second DRX group; or dormancy behavior of an Scell group corresponding to L3 third DRX groups is determined according to a preset rule, where both L2 and L3 are positive integers, the L2 second DRX groups are some or all of DRX groups corresponding to the second PDCCHs, and the L3 third DRX groups are some or all of the DRX groups corresponding to the second PDCCHs.

Optionally, the second DRX group includes an SPcell, and the third DRX group does not include an SPcell.

Optionally, the preset rule includes at least one of the following:
- an Scell group in some or all of the third DRX groups enters a non-dormancy state;
- an Scell group in some or all of the third DRX groups enters a dormancy state;
- in a case that an RRC configuration carries a target indication, the dormancy behavior of the Scell group in the DRX group corresponding to the second PDCCH which is undetected is determined based on the target indication, where the target indication is used to indicate default dormancy behavior of an Scell group in a third DRX group corresponding to each second PDCCH;
- in a case that an RRC configuration does not carry the target indication, the dormancy behavior of the Scell group in the DRX group corresponding to the second PDCCH which is undetected is determined based on default dormancy behavior; or
- the dormancy behavior of the Scell group in the DRX group corresponding to the second PDCCH which is undetected is consistent with latest dormancy behavior.

Optionally, the method further includes:
- sending high-layer signaling to the terminal, where the high-layer signaling carries power saving offsets PS-offsets in a one-to-one correspondence with the DRX groups.

Optionally, the first PDCCH further includes a wake-up indication, where the wake-up indication is used to indicate an on or off state of a drx-onDurationTimer.

Optionally, in a case that a wake-up indication corresponding to a fourth DRX group indicates that the drx-onDurationTimer is off, an Scell group in the fourth DRX group enters a dormancy state, where the fourth DRX group is any one of the DRX groups.

Optionally, the first PDCCH is used to detect downlink control information DCI that is in a preset format and scrambled with a power saving radio network temporary identifier PS-RNTI.

It should be noted that this embodiment serves as an embodiment of the network device corresponding to the embodiment shown in FIG. 2. For specific implementations of this embodiment, reference may be made to related description of the embodiment shown in FIG. 2, and a same effect can be achieved. In order to avoid repeating the description, details are not be described herein again.

Figure 9:
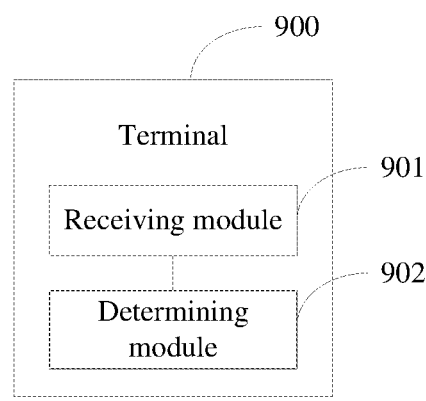
FIG. 9 is a structural diagram of a terminal according to an embodiment of the present application.

FIG. 9 is a structural diagram of a terminal according to an embodiment of the present application. As shown in FIG. 9, the terminal 900 includes:
- a receiving module 901, configured to receive a first physical downlink control channel PDCCH; and
- a determining module 902, configured to determine dormancy behavior of an Scell group based on the first PDCCH, where
- the first PDCCH carries Scell dormancy indications corresponding to at least two DRX groups, each Scell dormancy indication is used to indicate dormancy behavior of an Scell group in one of the DRX groups, and the dormancy behavior includes entering a dormancy state or entering a non-dormancy state.

Optionally, the first PDCCH includes a second PDCCH in a one-to-one correspondence with the DRX group, and the Scell dormancy indication carried in the second PDCCH is used to indicate dormancy behavior of a first Scell group that is an Scell group in a DRX group corresponding to the second PDCCH.

Optionally, the second PDCCH is a PDCCH of a special cell SPcell.

Optionally, the second PDCCH is a PDCCH of a target cell in a DRX group corresponding to the second PDCCH, where in a case that the DRX group corresponding to the second PDCCH includes an SPcell, the target cell is an SPcell; or in a case that the DRX group corresponding to the second PDCCH does not include an SPcell, the target cell is an Scell.

Optionally, the first PDCCH is a second PDCCH, and the second PDCCH carries at least two of the Scell dormancy indications.

Optionally, in a case that the terminal is configured with a search space set used to monitor the second PDCCH, and the terminal has not detected the second PDCCH, dormancy behavior of an Scell group in a DRX group corresponding to the second PDCCH which is undetected meets any one of the following:
- in a case that a radio resource control RRC configuration carries a target indication, the dormancy behavior of the Scell group in the DRX group corresponding to the second PDCCH which is undetected is determined based on the target indication, where the target indication is used to indicate dormancy behavior of an Scell group in a DRX group corresponding to each second PDCCH;
- in a case that an RRC configuration does not carry the target indication, the dormancy behavior of the Scell group in the DRX group corresponding to the second PDCCH which is undetected is determined based on default dormancy behavior; and
- the dormancy behavior of the Scell group in the DRX group corresponding to the second PDCCH which is undetected is consistent with latest dormancy behavior.

Optionally, in a case that the terminal is configured with a search space set used to monitor the second PDCCH, and a cell configured with a second PDCCH has no valid monitoring occasion, dormancy behavior of Scell groups in a DRX groups corresponding to N second PDCCHs that have no valid monitoring occasion meets any one of the following:
- Scell groups in L1 first DRX groups enter a non-dormancy state, and the L1 first DRX groups are some or all of DRX groups corresponding to the N second PDCCHs, where both L1 and N are positive integers;
- the Scell groups in the L1 first DRX groups enter a dormancy state;
- in a case that an RRC configuration carries a target indication, the dormancy behavior of the Scell group in the DRX group corresponding to the N second PDCCHs that have no valid monitoring occasion is determined based on the target indication, where the target indication is used to indicate dormancy behavior of an Scell group in a DRX group corresponding to each second PDCCH;
- in a case that an RRC configuration does not carry the target indication, the dormancy behavior of the Scell group in the DRX group corresponding to the N second PDCCHs that have no valid monitoring occasion is determined based on default dormancy behavior; and
- the dormancy behavior of the Scell group in the DRX group corresponding to the N second PDCCHs that have no valid monitoring occasion is consistent with latest dormancy behavior.

Optionally, in a case that the terminal is configured with a search space set used to monitor the second PDCCH, and an Scell configured with no second PDCCH has no valid monitoring occasion, dormancy behavior of an Scell group meets at least one of the following:
- dormancy behavior of an Scell group in L2 second DRX groups is determined based on an Scell dormancy indication in a second PDCCH corresponding to the second DRX group; or
- dormancy behavior of an Scell group corresponding to L3 third DRX groups is determined according to a preset rule, where
- both L2 and L3 are positive integers, the L2 second DRX groups are some or all of DRX groups corresponding to the second PDCCHs, and the L3 third DRX groups are some or all of the DRX groups corresponding to the second PDCCHs.

Optionally, the second DRX group includes an SPcell, but the third DRX group does not include an SPcell.

Optionally, the preset rule includes at least one of the following:
- an Scell group in some or all of the third DRX groups enters a non-dormancy state;
- an Scell group in some or all of the third DRX groups enters a dormancy state;
- in a case that an RRC configuration carries a target indication, the dormancy behavior of the Scell group in the DRX group corresponding to the second PDCCH which is undetected is determined based on the target indication, where the target indication is used to indicate default dormancy behavior of an Scell group in a third DRX group corresponding to each second PDCCH;
- in a case that an RRC configuration does not carry the target indication, the dormancy behavior of the Scell group in the DRX group corresponding to the second PDCCH which is undetected is determined based on default dormancy behavior; or
- the dormancy behavior of the Scell group in the DRX group corresponding to the second PDCCH which is undetected is consistent with latest dormancy behavior.

Optionally, the receiving module is further configured to:
- receive high-layer signaling sent by a network device, where the high-layer signaling carries power saving offsets PS-offsets in a one-to-one correspondence with the DRX groups.

Optionally, the first PDCCH further includes a wake-up indication, where the wake-up indication is used to indicate an on or off state of a drx-onDurationTimer.

Optionally, in a case that a wake-up indication corresponding to a fourth DRX group indicates that the drx-onDurationTimer is off, an Scell group in the fourth DRX group enters a dormancy state, where the fourth DRX group is any one of the DRX groups.

Optionally, the first PDCCH is used to detect downlink control information DCI that is in a preset format and scrambled with a power saving radio network temporary identifier PS-RNTI.

The terminal provided in this embodiment of the present application can implement processes implemented by the terminal in the method embodiment of FIG. 2. To avoid repetition, details are not described herein again.

Figure 10:
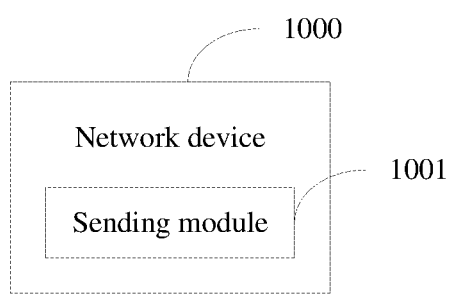
FIG. 10 is a structural diagram of a network device according to an embodiment of the present application.

FIG. 10 is a structural diagram of a network device according to an embodiment of the present application. As shown in FIG. 10, the network device 1000 includes:
- a sending module 1001, configured to send a first physical downlink control channel PDCCH to a terminal, where the first PDCCH carries Scell dormancy indications corresponding to at least two DRX groups, each Scell dormancy indication is used to indicate dormancy behavior of an Scell group in one of the DRX groups, and the dormancy behavior includes entering a dormancy state or entering a non-dormancy state.

Optionally, the first PDCCH includes second PDCCHs in a one-to-one correspondence with the DRX groups, and the Scell dormancy indication carried in the second PDCCH is used to indicate dormancy behavior of a first Scell group that is an Scell group in a DRX group corresponding to the second PDCCH.

Optionally, the second PDCCH is a PDCCH of a special cell SPcell.

Optionally, the second PDCCH is a PDCCH of a target cell in a DRX group corresponding to the second PDCCH, where in a case that the DRX group corresponding to the second PDCCH includes an SPcell, the target cell is an SPcell; or in a case that the DRX group corresponding to the second PDCCH does not include an SPcell, the target cell is an Scell.

Optionally, the first PDCCH is a second PDCCH, and the second PDCCH carries at least two of the Scell dormancy indications.

Optionally, the sending module 1001 is further configured to: send a radio resource control RRC configuration to the terminal, where the RRC configuration is used to indicate that: in a case that the terminal is configured with a search space set used to monitor the second PDCCH, and the terminal has not detected the second PDCCH, dormancy behavior of an Scell group in a DRX group corresponding to the second PDCCH which is undetected meets any one of the following:
- in a case that a radio resource control RRC configuration carries a target indication, the dormancy behavior of the Scell group in the DRX group corresponding to the second PDCCH which is undetected is determined based on the target indication, where the target indication is used to indicate dormancy behavior of an Scell group in a DRX group corresponding to each second PDCCH;
- in a case that an RRC configuration does not carry the target indication, the dormancy behavior of the Scell group in the DRX group corresponding to the second PDCCH which is undetected is determined based on default dormancy behavior; and
- the dormancy behavior of the Scell group in the DRX group corresponding to the second PDCCH which is undetected is consistent with the latest dormancy behavior.

Optionally, the sending module 1001 is further configured to: send a radio resource control RRC configuration to the terminal, where the RRC configuration is used to indicate that: in a case that the terminal is configured with a search space set used to monitor the second PDCCH, and a cell configured with a second PDCCH has no valid monitoring occasion, dormancy behavior of Scell groups in DRX groups corresponding to N second PDCCHs that have no valid monitoring occasion meets any one of the following:
- Scell groups in L1 first DRX groups enter a non-dormancy state, and the L1 first DRX groups are some or all of DRX groups corresponding to the N second PDCCHs, where both L1 and N are positive integers;
- the Scell groups in the L1 first DRX groups enter a dormancy state;
- in a case that an RRC configuration carries a target indication, the dormancy behavior of the Scell group in the DRX group corresponding to the N second PDCCHs that have no valid monitoring occasion is determined based on the target indication, where the target indication is used to indicate dormancy behavior of an Scell group in a DRX group corresponding to each second PDCCH;

in a case that an RRC configuration does not carry the target indication, the dormancy behavior of the Scell group in the DRX group corresponding to the N second PDCCHs that have no valid monitoring occasion is determined based on default dormancy behavior; and the dormancy behavior of the Scell group in the DRX group corresponding to the N second PDCCHs that have no valid monitoring occasion is consistent with the latest dormancy behavior.

Optionally, the sending module 1001 is further configured to: send a radio resource control RRC configuration to the terminal, where the RRC configuration is used to indicate that: in a case that the terminal is configured with a search space set used to monitor the second PDCCH, and an Scell configured with no second PDCCH has no valid monitoring occasion, dormancy behavior of an Scell group meets at least one of the following:

dormancy behavior of an Scell group in L2 second DRX groups is determined based on an Scell dormancy indication in a second PDCCH corresponding to a second DRX group; or dormancy behavior of an Scell group corresponding to L3 third DRX groups is determined according to a preset rule, where both L2 and L3 are positive integers, the L2 second DRX groups are some or all of DRX groups corresponding to the second PDCCHs, and the L3 third DRX groups are some or all of the DRX groups corresponding to the second PDCCHs.

Optionally, the second DRX group includes an SPcell, but the third DRX group does not include an SPcell.

Optionally, the preset rule includes at least one of the following:

an Scell group in some or all of the third DRX groups enters a non-dormancy state;

an Scell group in some or all of the third DRX groups enters a dormancy state;

in a case that an RRC configuration carries a target indication, the dormancy behavior of the Scell group in the DRX group corresponding to the second PDCCH which is undetected is determined based on the target indication, where the target indication is used to indicate default dormancy behavior of an Scell group in a third DRX group corresponding to each second PDCCH;

in a case that an RRC configuration does not carry the target indication, the dormancy behavior of the Scell group in the DRX group corresponding to the second PDCCH which is undetected is determined based on default dormancy behavior; or the dormancy behavior of the Scell group in the DRX group corresponding to the second PDCCH which is undetected is consistent with the latest dormancy behavior.

Optionally, the sending module 1001 is further configured to: send high-layer signaling to the terminal, where the high-layer signaling carries power saving offsets PS-offsets in a one-to-one correspondence with the DRX groups.

Optionally, the first PDCCH further includes a wake-up indication, where the wake-up indication is used to indicate an on or off state of a drx-onDurationTimer.

Optionally, in a case that a wake-up indication corresponding to a fourth DRX group indicates that the drx-onDurationTimer is off, an Scell group in the fourth DRX group enters a dormancy state, where the fourth DRX group is any one of the DRX groups.

Optionally, the first PDCCH is used to detect downlink control information DCI that is in a preset format and scrambled with a power saving radio network temporary identifier PS-RNTI.

The network device provided in this embodiment of the present application can implement the processes implemented by the network device in the method embodiment of FIG. 8. To avoid repetition, details are not described herein again.

Figure 11:
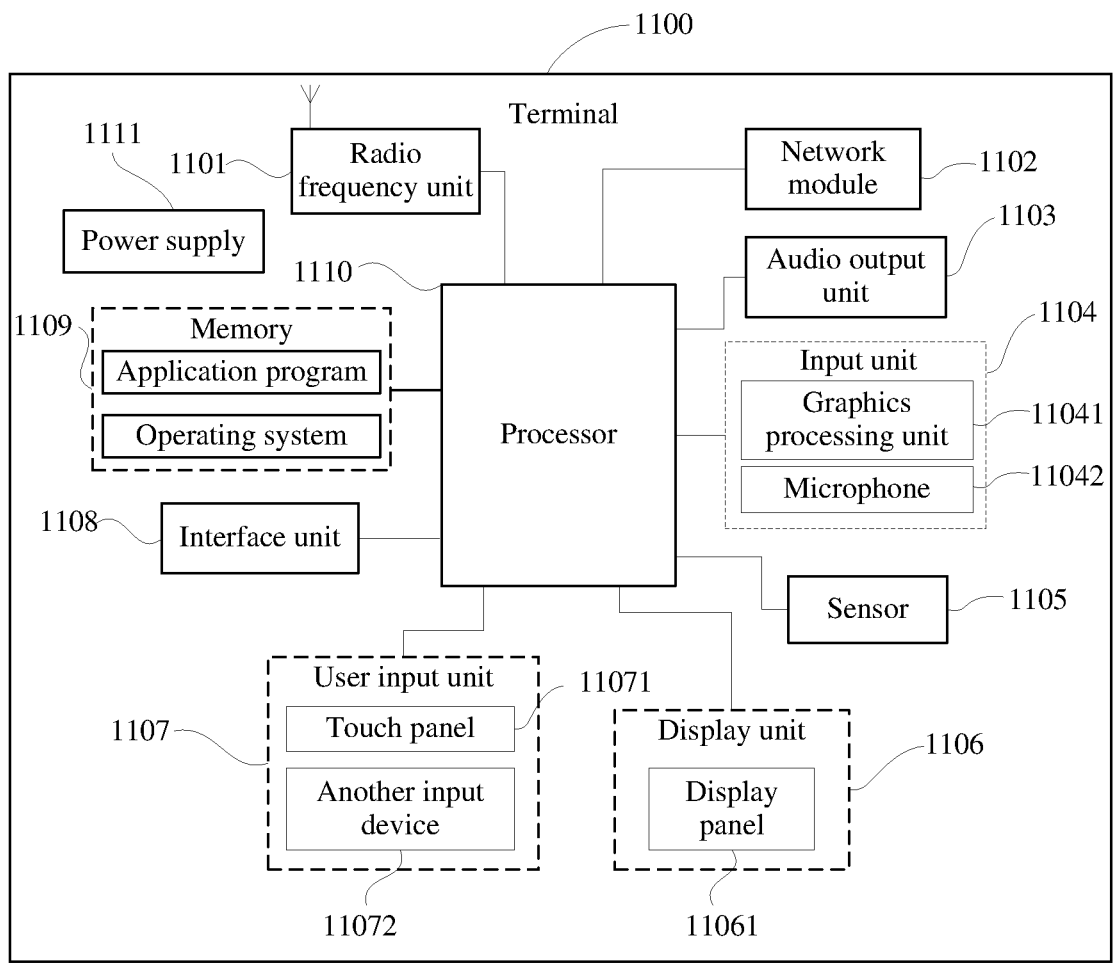
FIG. 11 is a structural diagram of another terminal according to an embodiment of the present application.

FIG. 11 is a schematic diagram of a hardware structure of a terminal according to the embodiments of the present application.

The terminal 1100 includes but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, a power supply 1111, and the like. A person skilled in the art may understand that the structure of the terminal shown in FIG. 11 does not constitute a limitation on the terminal. The terminal may include more or fewer components than those shown in the figure, or some components may be combined, or there may be a different component arrangement. In this embodiment of the present application, the terminal includes but is not limited to a mobile phone, a tablet computer, a laptop computer, a palmtop computer, an in-vehicle terminal, a wearable device, and a pedometer.

The radio frequency unit 1101 is configured to receive a first physical downlink control channel PDCCH.

The processor 1110 is configured to determine dormancy behavior of an Scell group based on the first PDCCH.

The first PDCCH carries Scell dormancy indications in a one-to-one correspondence with at least two DRX groups. Each Scell dormancy indication is used to indicate dormancy behavior of an Scell group in one of the DRX groups. The dormancy behavior includes entering a dormancy state or entering a non-dormancy state.

It should be understood that, in this embodiment, the processor 1110 and the radio frequency unit 1101 can implement the processes implemented by the terminal in the method embodiment in FIG. 2. To avoid repetition, details are not described herein again.

It should be understood that, in this embodiment of the present application, the radio frequency unit 1101 may be configured to receive and send information or receive and send a signal in a call process. Specifically, after downlink data from a base station is received, the processor 1110 processes the downlink data. In addition, uplink data is sent to the base station. Generally, the radio frequency unit 1101 includes, but is not limited to, an antenna, at least one amplifier, a transceiver, a coupler, a low noise amplifier, and a duplexer. In addition, the radio frequency unit 1101 may also communicate with a network and another device by using a wireless communications system.

The terminal provides wireless broadband Internet access for a user by using the network module 1102, for example, helping the user send and receive an email, browse a web page, and access streaming media.

The audio output unit 1103 may convert audio data received by the radio frequency unit 1101 or the network module 1102 or stored in the memory 1109 into an audio signal and output the audio signal as a sound. In addition, the audio output unit 1103 may further provide an audio output (for example, a call signal received voice, or a message received voice) related to a specific function implemented by the terminal 1100. The audio output unit 1103 includes a loudspeaker, a buzzer, a receiver, and the like.

The input unit 1104 is configured to receive audio or video signals. The input unit 1104 may include a graphics processing unit (GPU) 11041 and a microphone 11042. The graphics processing unit 11041 processes image data of a static image or video obtained by an image capture apparatus (such as, a camera) in a video capture mode or an image capture mode. A processed image frame may be displayed on the display unit 1106. The image frame processed by the graphics processing unit 11041 may be stored in the memory 1109 (or another storage medium) or sent by using the radio frequency unit 1101 or the network module 1102. The microphone 11042 may receive sound and can process such sound into audio data. The processed audio data may be converted, in a telephone call mode, into a format that may be sent to a mobile communication base station by using the radio frequency unit 1101, and the audio data obtained after conversion is output.

The terminal 1100 further includes at least one sensor 1105, such as an optical sensor, a motion sensor, or another sensor. Specifically, the optical sensor includes an ambient light sensor and a proximity sensor. The ambient light sensor may adjust luminance of the display panel 11061 based on brightness of ambient light. The proximity sensor may turn off the display panel 11061 and/or backlight when the terminal 1100 is moved to an ear. As a type of the motion sensor, an accelerometer sensor may detect magnitude of acceleration in each direction (generally, on three axes), and may detect magnitude and a direction of gravity when being static. The accelerometer sensor may be used for recognizing a terminal gesture (for example, portrait and landscape orientation switching, a related game, or magnetometer posture calibration), a function related to vibration recognition (for example, a pedometer or a strike), or the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information entered by the user or information provided for the user. The display unit 1106 may include a display panel 11061. The display panel 11061 may be configured in a form of a liquid crystal display (LCD), an organic light-emitting diode (OLED), or the like.

The user input unit 1107 may be configured to receive input digit or character information and generate key signal input related to user settings and function control of the terminal. Specifically, the user input unit 1107 includes a touch panel 11071 and another input device 11072. The touch panel 11071, also called a touchscreen, may collect a touch operation of a user on or near the touch panel (for example, the operation of the user on the touch panel 11071 or near the touch panel 11071 by using any suitable accessory such as a finger or a stylus). The touch panel 11071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 1110, and can receive and execute a command sent by the processor 1110. In addition, the touch panel 11071 may be implemented by using various types such as a resistive type, a capacitive type, an infrared ray type or a surface acoustic wave type. In addition to the touch panel 11071, the user input unit 1107 may further include another input device 11072. Specifically, the another input device 11072 may include but is not limited to: a physical keyboard, a function key (such as a volume control key, or a switch key), a trackball, a mouse, and a joystick. Details are not described herein.

Further, the touch panel 11071 may cover the display panel 11061. After detecting the touch operation on or near the touch panel 11071, the touch panel 11071 transmits the touch operation to the processor 1110 to determine a type of a touch event, and then the processor 1110 provides corresponding visual output on the display panel 11061 based on the type of the touch event. Although in FIG. 11, the touch panel 11071 and the display panel 11061 implement input and output functions of the terminal as two independent components, in some embodiments, the touch panel 11071 and the display panel 11061 may be integrated to implement the input and output functions of the terminal. This is not specifically limited herein.

The interface unit 1108 is an interface connecting an external apparatus to the terminal 1100. For example, the external apparatus may include a wired or wireless headset port, an external power supply (or battery charger) port, a wired or wireless data port, a storage card port, a port configured to connect to an apparatus having a recognition module, an audio input/output (I/O) port, a video I/O port, a headset port, and the like. The interface unit 1108 may be configured to receive input (for example, data information and power) from the external apparatus and transmit the received input to one or more elements in the terminal 1100, or may be configured to transmit data between the terminal 1100 and the external apparatus.

The memory 1109 may be configured to store a software program and various data. The memory 1109 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 1109 may include a high-speed random access memory or a nonvolatile memory, for example, at least one disk storage device, a flash memory, or another volatile solid-state storage device.

The processor 1110 is a control center of the terminal, connects all parts of the entire terminal by using various interfaces and lines, and performs various functions of the terminal and data processing by running or executing a software program and/or a module stored in the memory 1109 and invoking data stored in the memory 1109, to perform overall monitoring on the terminal. The processor 1110 may include one or more processing units. Preferably, the processor 1110 may be integrated with an application processor and a modem processor. The application processor mainly processes an operating system, a user interface, an application, and the like. The modem processor mainly processes wireless communication. It may be understood that the modem processor may not be integrated into the processor 1110.

The terminal 1100 may further include the power supply 1111 (such as a battery) that supplies power to each component. Preferably, the power supply 1111 may be logically connected to the processor 1110 by using a power management system, so as to implement functions such as charging, discharging, and power consumption management by using the power management system.

In addition, the terminal 1100 includes some function modules not shown. Details are not described herein.

Preferably, an embodiment of the present application further provides a terminal, including a processor 1110, a memory 1109, and a computer program stored in the memory 1109 and executable on the processor 1110. When the computer program is executed by the processor 1110, processes of the foregoing embodiment of the method for processing an Scell dormancy indication are implemented, and a same technical effect can be achieved. To avoid repetition, details are not described herein again.

Figure 12:
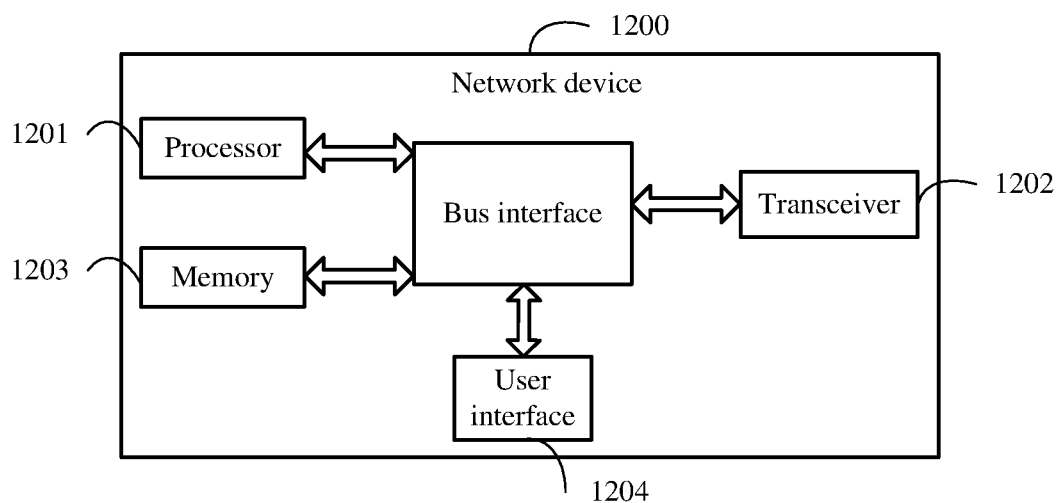
FIG. 12 is a structural diagram of another network device according to an embodiment of the present application.

FIG. 12 is a structural diagram of another network device according to an embodiment of the present application. As shown in FIG. 12, the network device 1200 includes: a processor 1201, a transceiver 1202, a memory 1203, and a bus interface.

The transceiver 1202 is configured send a first physical downlink control channel PDCCH to a terminal, where the first PDCCH carries Scell dormancy indications corresponding to at least two DRX groups, each Scell dormancy indication is used to indicate dormancy behavior of an Scell group in one of the DRX groups, and the dormancy behavior includes entering a dormancy state or entering a non-dormancy state.

It should be understood that, in this embodiment, the processor 1201 and the transceiver 1202 can implement the processes implemented by the network device in the method embodiment in FIG. 8. To avoid repetition, details are not described herein again.

In FIG. 12, a bus architecture may include any number of interconnected buses and bridges. Specifically, various circuits of one or more processors represented by the processor 1201 and a memory represented by the memory 1203 are interconnected. The bus architecture may further link other various circuits such as a peripheral device, a voltage stabilizer, and a power management circuit. These are well known in the art, and therefore are not further described in this specification. The bus interface provides an interface. The transceiver 1202 may be a plurality of elements, that is, include a transmitter and a receiver, and provide a unit for communicating with other various apparatuses on a transmission medium. For different user equipment, a user interface 1204 may also be an interface capable of connecting externally and internally to a required device. The connected device includes but is not limited to a keypad, a display, a loudspeaker, a microphone, and a joystick.

The processor 1201 is responsible for managing the bus architecture and common processing, and the memory 1203 may store data used when the processor 1201 performs an operation.

Preferably, an embodiment of the present application further provides a network device, including a processor 1201, a memory 1203, and a computer program stored in the memory 1203 and executable on the processor 1201. When the computer program is executed by the processor 1201, processes of the foregoing embodiment of the method for processing an Scell dormancy indication are implemented, and a same technical effect can be achieved. To avoid repetition, details are not described herein again.

An embodiment of the present application further provides a non-transitory computer-readable storage medium. The non-transitory computer-readable storage medium stores a computer program, and when the computer program is executed by a processor, the processes of the embodiments of the method for processing an Scell dormancy indication at the network device side, or when the computer program is executed by a processor, the processes of the embodiments of the method for processing an Scell dormancy indication at the terminal side are implemented, and a same technical effect can be achieved. To avoid repetition, details are not described herein again. The non-transitory computer-readable storage medium includes a read-only memory (ROM), a random access memory (RAM), a magnetic disk, an optical disc, or the like.

It should be noted that in this specification, the terms "include", "contain" and any other variants thereof are intended to cover non-exclusive inclusion, so that a process, a method, an article, or a device that includes a series of elements not only includes these elements, but may also include other elements not expressly listed, or also include elements inherent to this process, method, article, or device. Without more restrictions, an element defined by the statement "including a . . . " does not exclude another same element in a process, method, article, or apparatus that includes the element.

Based on the foregoing descriptions of the embodiments, a person skilled in the art may clearly understand that the method in the foregoing embodiment may be implemented by software plus a necessary universal hardware platform or by hardware only. In most circumstances, the former is a preferred implementation. Based on such an understanding, the technical solutions of the present application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the method described in the embodiments of the present application.

The embodiments of the present application are described above with reference to the accompanying drawings, but the present application is not limited to the foregoing specific implementations, and the foregoing specific implementations are only illustrative and not restrictive. Under the enlightenment of the present application, a person of ordinary skill in the art can make many forms without departing from the purpose of the present application and the protection scope of the claims, and all of these fall within the protection of the present application.

What is claimed is:

1. A method for processing a secondary cell (Scell) dormancy indication, performed by a terminal and comprising:

receiving a first physical downlink control channel (PDCCH); and determining dormancy behavior of an Scell group based on the first PDCCH, wherein the first PDCCH carries Scell dormancy indications in a one-to-one correspondence with at least two discontinuous reception groups (DRX groups), each Scell dormancy indication is used to indicate dormancy behavior of an Scell group in one of DRX groups, and the dormancy behavior comprises entering a dormancy state or entering a non-dormancy state; wherein the first PDCCH comprises one second PDCCH, or at least two second PDCCHs;

in a case that the first PDCCH comprises one second PDCCH, the second PDCCH carries at least two Scell dormancy indications; in a case that the first PDCCH comprises at least two second PDCCHs, each second PDCCH carries one Scell dormancy indication;
the first PDCCH comprises second PDCCHs in a one-to-one correspondence with the DRX groups, and a second PDCCH is a PDCCH of a special cell (SPcell); or the first PDCCH is a second PDCCH, and the second PDCCH carries at least two of the Scell dormancy indications; and
in a case that the terminal is configured with a search space set used to monitor the second PDCCH, and an Scell, configured with no second PDCCH, has no valid monitoring occasion, dormancy behavior of an Scell group meets at least one of following:
dormancy behavior of an Scell group in L2 second DRX groups being determined based on an Scell dormancy indication in a second PDCCH corresponding to a second DRX group; or
dormancy behavior of an Scell group corresponding to L3 third DRX groups being determined according to a preset rule, wherein
both L2 and L3 are positive integers, the L2 second DRX groups are some or all of DRX groups corresponding to the second PDCCHs, and the L3 third DRX groups are some or all of the DRX groups corresponding to the second PDCCHs;
the second DRX group comprises an SPcell, and each third DRX group does not comprise an SPcell; and
the preset rule comprises any one of following:
an Scell group in some or all of the third DRX groups entering a non-dormancy state;
an Scell group in some or all of the third DRX groups entering a dormancy state;
in a case that a radio resource control (RRC) configuration carries a target indication, being determined based on the target indication, wherein the target indication is used to indicate default dormancy behavior of an Scell group in a third DRX group corresponding to each second PDCCH;
in a case that an RRC configuration does not carry the target indication, being determined based on default dormancy behavior; and
being consistent with the latest dormancy behavior.

2. The method according to claim 1, wherein the first PDCCH comprises second PDCCHs in a one-to-one correspondence with the DRX groups, and an Scell dormancy indication carried in a second PDCCH is used to indicate dormancy behavior of a first Scell group, wherein the first Scell group is an Scell group in a DRX group corresponding to the second PDCCH.

3. The method according to claim 2, wherein the second PDCCH is a PDCCH of a special cell (SPcell); or
the second PDCCH is a PDCCH of a target cell in a DRX group corresponding to the second PDCCH, wherein in a case that the DRX group corresponding to the second PDCCH comprises an SPcell, the target cell is an SPcell; or in a case that the DRX group corresponding to the second PDCCH does not comprise an SPcell, the target cell is an Scell.

4. The method according to claim 3, wherein in a case that the terminal is configured with a search space set used to monitor the second PDCCH, and the terminal has not detected the second PDCCH, dormancy behavior of an Scell group in a DRX group corresponding to the second PDCCH which is undetected meets any one of following:
in a case that a radio resource control (RRC) configuration carries a target indication, being determined based on the target indication, wherein the target indication is used to indicate dormancy behavior of an Scell group in a DRX group corresponding to each second PDCCH;
in a case that an RRC configuration does not carry the target indication, being determined based on default dormancy behavior; and
being consistent with the latest dormancy behavior; or
in a case that the terminal is configured with a search space set used to monitor the second PDCCH, and a cell configured with a second PDCCH has no valid monitoring occasion, dormancy behavior of Scell groups in DRX groups corresponding to N second PDCCHs that have no valid monitoring occasion meets any one of following:
Scell groups in L1 first DRX groups entering a non-dormancy state, wherein the L1 first DRX groups are some or all of DRX groups corresponding to the N second PDCCHs, and both L1 and N are positive integers;
the Scell groups in the L1 first DRX groups entering a dormancy state;
in a case that an configuration carries a target indication, being determined based on the target indication, wherein the target indication is used to indicate dormancy behavior of an Scell group in a DRX group corresponding to each second PDCCH;
in a case that an RRC configuration does not carry the target indication, being determined based on default dormancy behavior; and
being consistent with the latest dormancy behavior.

5. The method according to claim 1, further comprising:
receiving high-layer signaling sent by a network device, wherein the high-layer signaling carries power saving offsets PS-offsets in a one-to-one correspondence with the DRX groups.

6. The method according to claim 1, wherein the first PDCCH further comprises a wake-up indication, wherein the wake-up indication is used to indicate an on or off state of a drx-onDurationTimer.

7. The method according to claim 6, wherein in a case that a wake-up indication corresponding to a fourth DRX group indicates that the drx-onDurationTimer is off, an Scell group in the fourth DRX group enters a dormancy state, wherein the fourth DRX group is any one of the DRX groups.

8. The method according to claim 1, wherein the first PDCCH is used to detect downlink control information DCI that is in a preset format and scrambled with a power saving radio network temporary identifier (PS-RNTI); and
the first PDCCH is a second PDCCH, and the second PDCCH carries at least two of the Scell dormancy indications.

9. A method for processing a secondary cell (Scell) dormancy indication, performed by a network device and comprising:
sending a first physical downlink control channel (PDCCH) to a terminal, wherein the first PDCCH carries Scell dormancy indications corresponding to at least two discontinuous reception groups (DRX groups), each Scell dormancy indication is used to indicate dormancy behavior of an Scell group in one of DRX groups, and the dormancy behavior comprises entering a dormancy state or entering a non-dormancy state; wherein
the first PDCCH comprises one second PDCCH, or at least two second PDCCHs;
in a case that the first PDCCH comprises one second PDCCH, the second PDCCH carries at least two Scell dormancy indications; in a case that the first PDCCH comprises at least two second PDCCHs, each second PDCCH carries one Scell dormancy indication;

the first PDCCH comprises second PDCCHs in a one-to-one correspondence with the DRX groups, and a second PDCCH is a PDCCH of a special cell (SPcell); or the first PDCCH is a second PDCCH, and the second PDCCH carries at least two of the Scell dormancy indications; and the method further comprises:

sending a radio resource control (RRC) configuration to the terminal, wherein the RRC configuration is used to indicate that: in a case that the terminal is configured with a search space set used to monitor the second PDCCH, and an Scell configured with no second PDCCH has no valid monitoring occasion, dormancy behavior of an Scell group meets at least one of following:

dormancy behavior of an Scell group in L2 second DRX groups being determined based on an Scell dormancy indication in a second PDCCH corresponding to a second DRX group; or dormancy behavior of an Scell group corresponding to L3 third DRX groups being determined according to a preset rule, wherein both L2 and L3 are positive integers, the L2 second DRX groups are some or all of DRX groups corresponding to the second PDCCHs, and the L3 third DRX groups are some or all of the DRX groups corresponding to the second PDCCHs;

the second DRX group comprises an SPcell, and each third DRX group does not comprise an SPcell; and the preset rule comprises at least one of following:

an Scell group in some or all of the third DRX groups entering a non-dormancy state;

an Scell group in some or all of the third DRX groups entering a dormancy state;

in a case that an RRC configuration carries a target indication, being determined based on the target indication, wherein the target indication is used to indicate default dormancy behavior of an Scell group in a third DRX group corresponding to each second PDCCH;

in a case that an RRC configuration does not carry the target indication, being determined based on default dormancy behavior; or being consistent with the latest dormancy behavior.

10. The method according to claim 9, wherein the first PDCCH comprises second PDCCHs in a one-to-one correspondence with the DRX groups, and an Scell dormancy indication carried in a second PDCCH is used to indicate dormancy behavior of a first Scell group, wherein the first Scell group is an Scell group in a DRX group corresponding to the second PDCCH.

11. The method according to claim 10, wherein the second PDCCH is a PDCCH of a special cell (SPcell); and the second PDCCH is a PDCCH of a target cell in a DRX group corresponding to the second PDCCH, wherein in a case that the DRX group corresponding to the second PDCCH comprises an SPcell, the target cell is an SPcell; or in a case that the DRX group corresponding to the second PDCCH does not comprise an SPcell, the target cell is an Scell.

12. The method according to claim 11, further comprising:

sending a radio resource control (RRC) configuration to the terminal, wherein the RRC configuration is used to indicate that: in a case that the terminal is configured with a search space set used to monitor the second PDCCH, and the terminal has not detected the second PDCCH, dormancy behavior of an Scell group in a DRX group corresponding to the second PDCCH which is undetected meets any one of following:

in a case that an RRC configuration carries a target indication, being determined based on the target indication, wherein the target indication is used to indicate dormancy behavior of an Scell group in a DRX group corresponding to each second PDCCH;

in a case that an RRC configuration does not carry the target indication, being determined based on default dormancy behavior; and being consistent with the latest dormancy behavior; or sending an RRC configuration to the terminal, wherein the RRC configuration is used to indicate that: in a case that the terminal is configured with a search space set used to monitor the second PDCCH, and a cell configured with a second PDCCH has no valid monitoring occasion, dormancy behavior of Scell groups in DRX groups corresponding to N second PDCCHs that have no valid monitoring occasion meets any one of following:

Scell groups in L1 first DRX groups entering a non-dormancy state, wherein the L1 first DRX groups are some or all of DRX groups corresponding to the N second PDCCHs, and both L1 and N are positive integers;

the Scell groups in the L1 first DRX groups entering a dormancy state;

in a case that an RRC configuration carries a target indication, being determined based on the target indication, wherein the target indication is used to indicate dormancy behavior of an Scell group in a DRX group corresponding to each second PDCCH;

in a case that an RRC configuration does not carry the target indication, being determined based on default dormancy behavior; and being consistent with the latest dormancy behavior.

13. The method according to claim 9, wherein the first PDCCH further comprises a wake-up indication, wherein the wake-up indication is used to indicate an on or off state of a drx-onDurationTimer; and in a case that a wake-up indication corresponding to a fourth DRX group indicates that the drx-onDurationTimer is off, an Scell group in the fourth DRX group enters a dormancy state, wherein the fourth DRX group is any one of the DRX groups.

14. The method according to claim 9, wherein the first PDCCH is used to detect downlink control information DCI that is in a preset format and scrambled with a power saving radio network temporary identifier (PS-RNTI); and the first PDCCH is a second PDCCH, and the second PDCCH carries at least two of the Scell dormancy indications.

15. A terminal, comprising a memory, a processor, and a program stored in the memory and executable on the processor, wherein the program, when executed by the processor, cause the terminal to perform:

receiving a first physical downlink control channel (PDCCH); and determining dormancy behavior of an Scell group based on the first PDCCH, wherein the first PDCCH carries Scell dormancy indications in a one-to-one correspondence with at least two discontinuous reception groups (DRX groups), each Scell dormancy indication is used to indicate dormancy behavior of an Scell group in one of DRX groups, and the dormancy behavior comprises entering a dormancy state or entering a non-dormancy state; wherein the first PDCCH comprises one second PDCCH, or at least two second PDCCHs;

in a case that the first PDCCH comprises one second PDCCH, the second PDCCH carries at least two Scell dormancy indications; in a case that the first PDCCH comprises at least two second PDCCHs, each second PDCCH carries one Scell dormancy indication;

the first PDCCH comprises second PDCCHs in a one-to-one correspondence with the DRX groups, and a second PDCCH is a PDCCH of a special cell (SPcell); or the first PDCCH is a second PDCCH, and the second PDCCH carries at least two of the Scell dormancy indications; and in a case that the terminal is configured with a search space set used to monitor the second PDCCH, and an Scell, configured with no second PDCCH, has no valid monitoring occasion, dormancy behavior of an Scell group meets at least one of following:

dormancy behavior of an Scell group in L2 second DRX groups being determined based on an Scell dormancy indication in a second PDCCH corresponding to a second DRX group; or dormancy behavior of an Scell group corresponding to L3 third DRX groups being determined according to a preset rule, wherein both L2 and L3 are positive integers, the L2 second DRX groups are some or all of DRX groups corresponding to the second PDCCHs, and the L3 third DRX groups are some or all of the DRX groups corresponding to the second PDCCHs;

the second DRX group comprises an SPcell, and each third DRX group does not comprise an SPcell; and the preset rule comprises any one of following:

an Scell group in some or all of the third DRX groups entering a non-dormancy state;

an Scell group in some or all of the third DRX groups entering a dormancy state;

in a case that a radio resource control (RRC) configuration carries a target indication, being determined based on the target indication, wherein the target indication is used to indicate default dormancy behavior of an Scell group in a third DRX group corresponding to each second PDCCH;

in a case that an RRC configuration does not carry the target indication, being determined based on default dormancy behavior; and being consistent with the latest dormancy behavior.

16. A network device, comprising a memory, a processor, and a program stored in the memory and executable on the processor, wherein when the program is executed by the processor, steps of the method for processing an Scell dormancy indication according to claim 9 are implemented.

* * * * *